(12) United States Patent
Hazel et al.

(10) Patent No.: US 10,846,285 B2
(45) Date of Patent: Nov. 24, 2020

(54) MATERIALIZATION FOR DATA EDGE PLATFORM

(71) Applicant: CHAOSSEARCH, INC., Andover, MA (US)

(72) Inventors: Thomas Hazel, Boston, MA (US); David Noblet, Londonderry, NH (US); Grant Mills, Littleton, MA (US)

(73) Assignee: CHAOSSEARCH, INC., Andover, MA (US)

( * ) Notice: Subject to any disclaimer, the term of this patent is extended or adjusted under 35 U.S.C. 154(b) by 177 days.

(21) Appl. No.: 16/174,096

(22) Filed: Oct. 29, 2018

(65) Prior Publication Data

US 2019/0065545 A1 Feb. 28, 2019

Related U.S. Application Data

(63) Continuation-in-part of application No. 15/996,328, filed on Jun. 1, 2018.

(60) Provisional application No. 62/514,669, filed on Jun. 2, 2017, provisional application No. 62/548,341, filed on Aug. 21, 2017, provisional application No. 62/630,092, filed on Feb. 13, 2018.

(51) Int. Cl.

| | | |
|---|---|---|
| *G06F 17/00* | (2019.01) | |
| *G06F 16/23* | (2019.01) | |
| *G06F 16/13* | (2019.01) | |
| *G06F 16/21* | (2019.01) | |
| *G06F 16/2458* | (2019.01) | |
| *G06F 16/901* | (2019.01) | |
| *G06F 16/38* | (2019.01) | |
| *G06F 16/22* | (2019.01) | |
| *G06F 16/83* | (2019.01) | |
| *G06F 16/2455* | (2019.01) | |

(52) U.S. Cl.
CPC .......... *G06F 16/2393* (2019.01); *G06F 16/13* (2019.01); *G06F 16/211* (2019.01); *G06F 16/2282* (2019.01); *G06F 16/2455* (2019.01); *G06F 16/2458* (2019.01); *G06F 16/38* (2019.01); *G06F 16/83* (2019.01); *G06F 16/9027* (2019.01)

(58) Field of Classification Search
None
See application file for complete search history.

(56) References Cited

U.S. PATENT DOCUMENTS

| | | | | |
|---|---|---|---|---|
| 6,654,754 | B1 * | 11/2003 | Knauft | G06F 21/10 |
| 2003/0033588 | A1 * | 2/2003 | Alexander | G06F 9/54 |
| | | | | 717/107 |
| 2003/0033594 | A1 * | 2/2003 | Bowen | G06F 30/30 |
| | | | | 717/141 |
| 2003/0105620 | A1 * | 6/2003 | Bowen | G06F 30/33 |
| | | | | 703/22 |

(Continued)

*Primary Examiner* — Hasanul Mobin
(74) *Attorney, Agent, or Firm* — Procopio, Cory, Hargreaves & Savitch LLP.

(57) ABSTRACT

Disclosed are system and methods for processing and storing data files, using a data edge file format. The data edge file separates information about what symbols are in a data file and information about the corresponding location of those symbols in the data file. An index for the data files can be generated according to the data edge file format. Using the data edge index, a materialized view of a result set can be generated in response to a search query for the source data objects stored in object storage.

20 Claims, 10 Drawing Sheets

(56) References Cited

U.S. PATENT DOCUMENTS

| | | | |
|---|---|---|---|
| 2005/0203876 A1* | 9/2005 | Cragun | G06F 16/211 |
| 2005/0240352 A1* | 10/2005 | Liang | G06Q 10/087 |
| | | | 702/19 |
| 2007/0185914 A1* | 8/2007 | Prahlad | G06F 16/122 |
| 2010/0069035 A1* | 3/2010 | Johnson | H04W 92/18 |
| | | | 455/404.1 |
| 2010/0070486 A1* | 3/2010 | Punaganti Venkata | |
| | | | G06F 16/972 |
| | | | 707/722 |
| 2010/0332456 A1* | 12/2010 | Prahlad | H04L 67/1095 |
| | | | 707/664 |
| 2013/0337789 A1* | 12/2013 | Johnson | H04W 4/029 |
| | | | 455/414.1 |
| 2014/0279838 A1* | 9/2014 | Tsirogiannis | G06F 16/235 |
| | | | 707/603 |
| 2018/0081939 A1* | 3/2018 | Hopeman | G06F 16/24537 |
| 2018/0089224 A1* | 3/2018 | Muthuswamy | H04L 67/06 |
| 2018/0338166 A1* | 11/2018 | Amiga | H04L 65/605 |

* cited by examiner

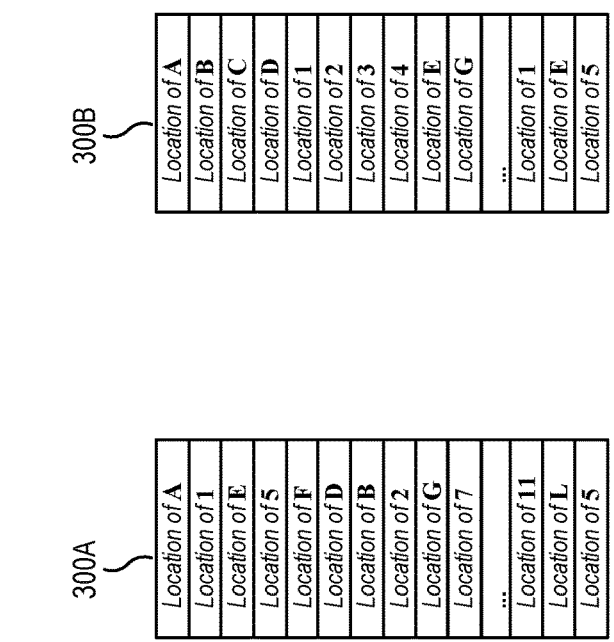
Fig. 3B
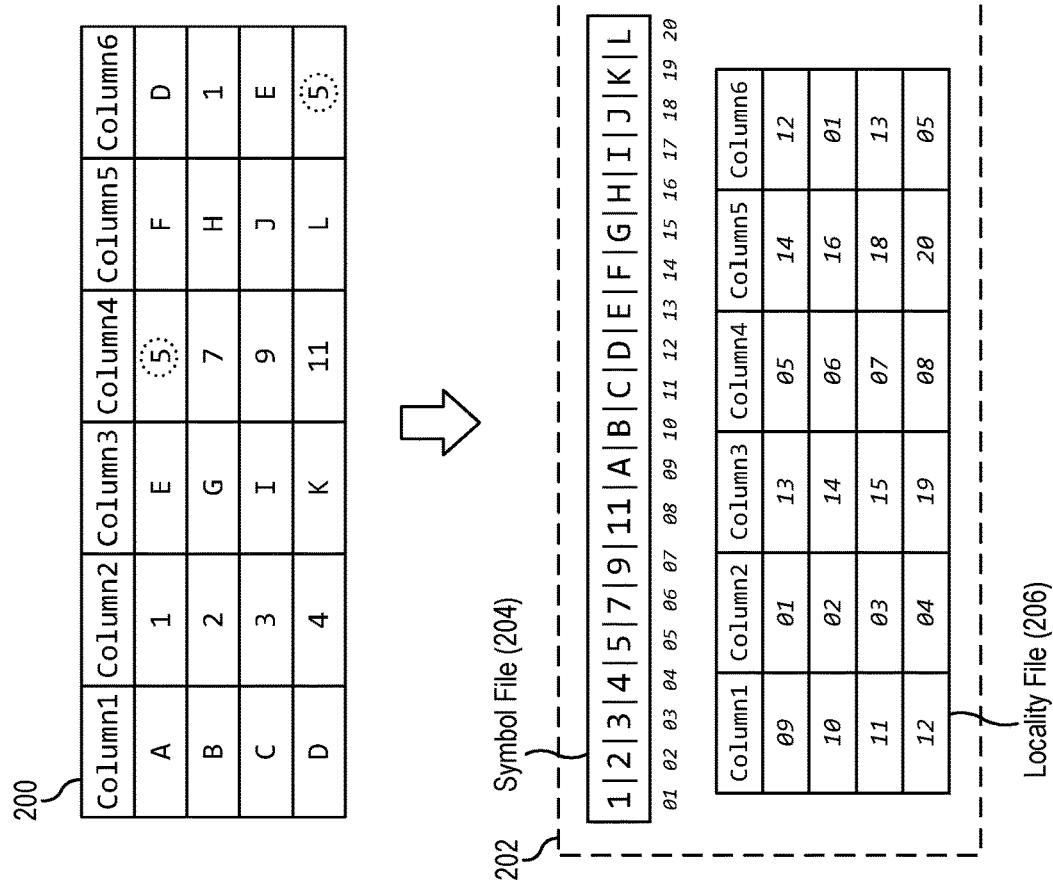
Fig. 3A
Fig. 2

MATERIALIZATION FOR DATA EDGE PLATFORM

CROSS-REFERENCE TO RELATED APPLICATIONS

This application is a continuation-in-part of U.S. patent application Ser. No. 15/996,328, filed on Jun. 1, 2018, which claims benefit of: U.S. Provisional Application No. 62/514,669, filed on Jun. 2, 2017; U.S. Provisional Application No. 62/548,341 filed on Aug. 21, 2017; and U.S. Provisional Application No. 62/630,092 filed on Feb. 13, 2018, the entire contents of each of which are incorporated by reference herein.

INTRODUCTION

The present disclosure relates generally to the field of object storage and file compression, more specifically, to systems and methods for efficiently storing and analyzing files in object storage.

Object storage is a type of data storage architecture that manages data as objects, which has become popular due to its prevalence in cloud storage services. Object storage may be considered a form of a distributed key/value storage service, where keys (unique indexes) and values (opaque data) is accessed via PUT, GET, and LIST interfaces. Consequently, such data is copied out to do variety of processing and/or analysis, where the results of this external execution is often put right back into object storage. The cycle of Extracting, Transforming, and Loading (ETL) data is the crux of the data swamp problem, though not the only issue. The advantages of object storage is its simplicity and scalability, encouraging cloud based storage services to be used as data lake repositories, where any type of data of any scale can be stored with the belief that value can be derived at a later date. However, this can lead to data being stored in a disjoined, disparate, and schema-less manner. Frequently this unstructured data is irregular, malformed, and chaotic, which is a direct result of object storage constructs.

Knowing what has been stored in object storage (e.g., "what's in your buckets") is another issue. In other words, understanding "what" to extract and "how" to extract it, is a major step before any type of ETL operation can be performed. The ability to group information into "like" subsets is important to efficiently use object storage. However, once this information has been identified, the actual data analysis is yet another significant hurdle to overcome.

Analysis of such disjoined, disparate, or malformed data traditionally requires either manual inspection via scaffolding such as via Hadoop™ (raw data) or manual transformation for analytic services such as Amazon Redshift™ (tabular data) and/or Elastic™ (text data). Whether manual inspection or transformation, each is time consuming, complicated, and costly; all contributing to the failures of "data lakes".

SUMMARY

Aspects presented herein provide a solution to these problems, enabling such functionality to be embedded directly into object storage; in essence, making object storage smarter and more capable. Aspects include a data format for universally representing any data source, with all its potential irregularities, e.g., everything from text based files such as Text, JSON, and CSV to image files such as PNG and JPG, and/or video files such as MPEG, AVI etc., so that the data can be virtually transformed and aggregated without considerable computation, while still providing built-in support for both relational queries and text searches. The data format can be manipulated without algorithmic execution and retrieve results at a speed of classic analytic solutions. The data format not only avoids increasing the actual storage footprint, but may decrease the storage footprint. The data format may be configured to intrinsically describe itself such that it can be exported into other data formats without unnecessary conversion. Aspects of the data format may be referred to herein as "data edge" or "data edging."

Data edging provides an ability to discover and organize data generically and concurrently, an ability to organize and represent data consistently and uniformly, and ability to compress and catalogue data to theoretical minimums, and an ability to query and analyze data without Extract, Transform, and Load. Data Edging comprises a storage format where any processing algorithm can be applied to create, organize, and retrieve information.

Data edging involves separating the symbols of a file from the symbols' location within the file. Compression technology may then use the symbol and location of the symbol as part of its algorithm and representation. Among others, symbols within a file may be, e.g., words, images, numbers, data, and time types, etc. For example, a document may comprise words (e.g., symbols) placed at particular locations (e.g., "locality") in a source file that should be reconstituted in a lossless approach. By separating the symbols and locations of the symbols, one can organize and compress data to its optimal state; mixing the two limits to what any given compression algorithm can achieve. Symbols and locality of the symbols are not "like" entities and thus cannot be reduced easily.

According to one aspect of the present disclosure, a method for searching object storage is provided. The method includes identifying a plurality of source data objects stored in one or more buckets of an object storage system, and generating an index based on the identified plurality of source data objects. The index includes a manifest, at least one symbol file, and at least one locality file, wherein the manifest specifies a mapping of the at least one symbol file to the corresponding at least one locality file. The method further includes receiving a search query for the plurality of source data objects stored in the object storage system, and generating a materialized view of a result set of the search query based on the manifest, the at least one symbol file, and the at least one locality file of the generated index.

In another example aspect, a computer apparatus for searching object storage is provided. The computer apparatus includes memory, and at least one processor coupled to the memory. The processor is configured to identify a plurality of source data objects stored in one or more buckets of an object storage system, and to generate an index based on the identified plurality of source data objects. The index includes a manifest, at least one symbol file, and at least one locality file, wherein the manifest specifies a mapping of the at least one symbol file to the corresponding at least one locality file. The processor is further configured to receive a search query for the plurality of source data objects stored in the object storage system, and generate a materialized view of a result set of the search query based on the manifest, the at least one symbol file, and the at least one locality file of the generated index.

According to another example aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2 is a block diagram depicting a structured data source file and a corresponding converted data edge file according to an example aspect.

FIGS. 3A and 3B depicts representations of a locality file in row-based and column-based orientations according to an example aspect.

DETAILED DESCRIPTION

Example aspects are described herein in the context of a system, method, and computer program product for processing and analyzing data stored in object storage. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
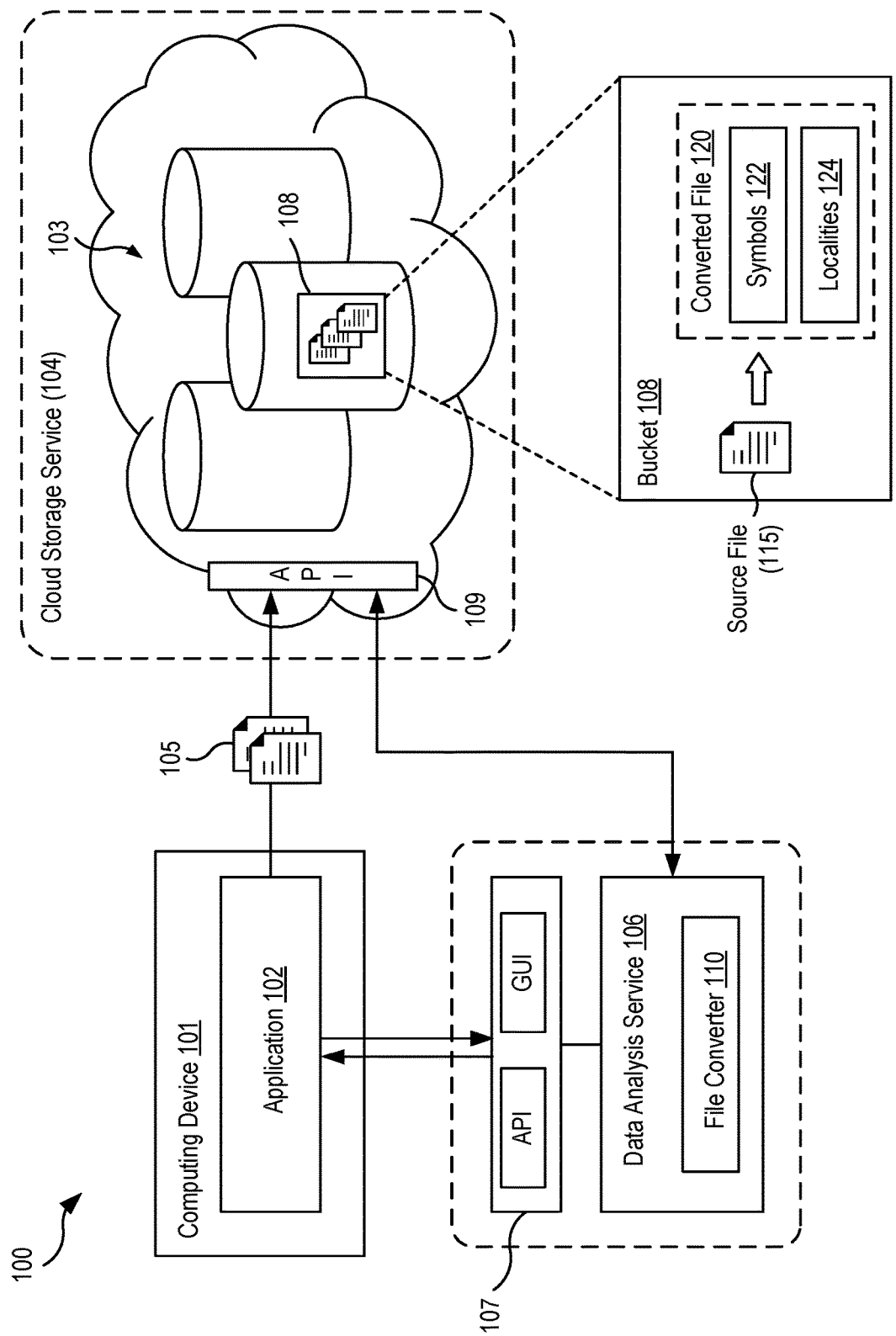
FIG. 1 is a block diagram illustrating a system for processing and analyzing data stored in object storage according to an example aspect.

FIG. 1 is a block diagram illustrating a system 100 for processing and analyzing data stored in object storage according to an example aspect. The system 100 includes a computing device 101 executing an application 102 that is configured to store data 105 in an object storage system 103. In the aspect shown, the object storage system 103 may be provided by a cloud storage service 104. In one example, the application 102 may have a multi-tier software architecture in which user data of the application is stored in a data layer is stored in the object storage 103. The application 102 may be configured to store, retrieve, modify, search, and/or access data in the object storage system 103 via an application programming interface 109 (API), REST-based interface (e.g., using PUT, GET, LIST operations), or other interfaces exposed by the cloud storage service 104.

The object storage system 103 (also referred to as object-based storage) may include one or more storage devices configured to provide a data storage architecture that manages data 105 as objects, in contrast to a file system-based storage architecture (which manages data in a file hierarchy) or a block-based storage architecture (which manages data as blocks within sectors and tracks of physical media). Examples of object storage include object-based storage provided by such cloud storage services as AWS Simple Storage Service (S3)™ made available by Amazon, Microsoft Azure Storage™, or Google Cloud Storage™. While discussed in the context of public cloud services, it is understood that aspects of the present disclosure may also be applied to "on premise" or private object-based storage systems.

The object storage system 103 is configured to store units of data 105 as "objects" (also referred to as "blobs" in some architectures), and maps each object to a unique identifier (e.g., key, index, object name). For clarity of explanation, the data 105 stored in object storage is interchangeably referred to as "files" in the present disclosure. The object storage system 103 may have a flat hierarchy and include a plurality of buckets 108, which are logical containers for holding the data 105. That is, each object may be stored in a particular bucket 108.

The data stored in the object storage system 103 may represent one or more computer files having a variety of file formats and types of data, including text data, binary data, log files, program data files, CSV (comma-separated values) files, XML files, JSON (JavaScript Object Notation) files, image files, audio files, and video files. The data 105 in object storage may be characterized as structured data, unstructured data, or semi-structured data. A structured data file includes data arranged and organized according to a formal data model, such as the row-and-column structure of relational databases or data tables (e.g., CSV files). While not conforming to some formal structure of data model, a semi-structured data file may include data that is organized or annotated according to some pre-defined manner, for example, data that contains tags, markers, and other syntax that separate semantic elements and assign attributes and a hierarchy to the data (e.g., XML, JSON files). An unstructured data file refers to data that lacks a pre-defined data model and is not organized in a pre-defined manner, such as data found in text-heavy files.

Typically, an application 102 may store an amorphous mix (structured data, semi-structured data, and unstructured data) of bulk data in the object storage system 103, resulting in data being stored in a disjointed, disparate, and schemeless manner. As described earlier, buckets 108 might only expose structure by virtue of keys and their associated object or blob. As such, from the point of view of a user, the objects stored in the object storage system 103 may conform to some unspecified structure that is unknown, unless a user downloads and manually inspects them (e.g., and determine the file is a csv or log file).

According to aspects of the present disclosure, the system 100 includes a data analysis service 106 configured to process and analyze the data 105 stored in the object storage system 103. As described in greater detail below, the data analysis service 106 includes a file converter module 110 configured to convert data in object storage to a specialized file format, referred to herein as a "data edge" file format that enables the data analysis service 106 to discover, refine, and query the object storage data in a more efficient manner. The data edge file format further allows improved compression of the data stored in object storage based on the separation of symbols from their location. The data edge file format models data sources in an edge space representation, of which can be analyzed via complex mathematical algorithms, such as linear algebra computation.

In some aspects, the data analysis service 106 may be configured to process files already stored in object storage, for example, all files contained in a selected bucket 108. In other aspects, the application 102 may store data 105 in object storage using the data analysis service 106 as an intermediary, which in turn converts the data 105 into data edge files stored in object storage.

In one implementation, the data analysis service 106 may be a distributed server application executing on one or more computing devices (not shown). The data analysis service 106 may include an interface 107 that enables the application 102 to discover, refine, and query the data 105 it has stored within its buckets in object storage. In some aspects, the interface 107 may be an API of the data analysis service 106 configured to provide the application 102 programmatic access to the functionality of the data analysis service 106 in relation to the data 105. In one aspect, the API of the data analysis service 106 may be configured to extend or override (i.e., "wrap") the API interface provided by the cloud storage service 104. In other aspects, the interface 107 of the data analysis service 106 may be a command-line or graphical user interface (GUI) of server-based application that enables a user to interactively discover, refine, and query the data 105 stored within object storage.

The data analysis service 106 may process data 105 in object storage in a manner that separates the symbols of a file from their location in the file. In one aspect, the data analysis service 106 may be configured to, given a source file 115 of data, generate a converted file 120 organized into: (1) a symbol portion 122 containing the symbols of the source file 115, and (2) a locality portion 124 containing values representing the respective locations of those symbols in the original source file 115. In some aspects, the data analysis service 106 may create two files from the source file 115: a symbol file (e.g., "filename.I2S", containing the symbol portion 122) and a locality file (e.g., "filename.L2I", containing the locality portion 124). In some implementations, the symbol file and the locality file may be concatenated into one file (e.g., after it is compressed), and in other cases, the symbol file and locality file may be maintained separately. In some aspects, the converted file 120 may further include a metadata portion (e.g., "filename.MDS") that contains metrics, statistics, and other metadata related to the original data source 105, to the data edge file, and to the conversion process performed.

Data compression techniques involve encoding some data using fewer bits than its original representation by finding patterns and eliminating redundancy. Consider the simple example of a data source file containing one hundred symbols, in which all symbols are the word "cat". A compressed version of this file may encode this file as "100cat" to eliminate the redundant instances of the symbol "cat," resulting in a data reduction of 300 units of information to 6 units. Data compression algorithms attempt to find common symbols within symbols, as well as sequences represented in a form smaller than its original representation. In another example, a sequence of numbers from one to a million, could be represented as "1ToMillion," with a saving factor of 6 times. It has been determined that as the source file gets larger, it becomes more difficult for a compression algorithm to find common or redundant patterns. Accordingly, the format of the data edge file is configured to organize symbols in a manner that facilitates more efficient data compression.

The following discussion provides detailed examples of converting source files of a variety of data types, including structured data (FIG. 2) such as CSV files, unstructured data (FIG. 4) such as text data, structured data with text values (FIG. 5), and semi-structured data (FIG. 6) such as JSON and XML files.

FIG. 2 is a block diagram depicting a structured data source file 200 and a corresponding converted data edge file 202 according to an example aspect. The source file 200 contains structured data having a plurality of records organized into rows and columns. For example, the source file contains values having symbols (e.g., "A", "1", "E", "5", "F", "D", etc.) arranged in a 4-row by 6-column table format (the row containing column names "Column1", "Column2", etc. is omitted from this discussion). The structured source file 200 is rendered in FIG. 2 in a table format for the sake of illustration, but it is understood that the structured data may be encoded in a variety of formats. For example, the source file 200 may be a delimiter-separated file (such as a CSV file) containing a plurality of records (i.e., lines), where each record comprises fields separated by a delimiter (e.g., comma). In another aspect, the structured source file 200 may be a log file containing a plurality of log entries, e.g., separated by a tab or whitespace character.

The file converter 110 may create a symbol file 204 associated with the source file that contains each unique symbol found in the source file 200. The file converter 110 may perform initial reduction of the source file 200. That is, the file converter 110 finds duplications and removes them, and finds sequences and orders them. In one aspect, the file converter 110 may scan through the file, identifying each unique symbol contained in the source file, order them, and disregard any duplicate symbols encountered. For example, the file converter 110 may identify that the source file 200 contains a duplicate symbol "5" in both the first row, fourth column, as well as the fourth row, sixth column (highlighted by dashed circles). In this case, the file converter 110 only includes a single instance of the symbol "5" in the resulting symbol file 204.

In some aspects, the file converter 110 may represent symbols as "Strings" type. In some cases, it may be more efficient to convert one or more symbols from the source file into a different data type, such as a number or time period (i.e., date/time). These constructs of String, Number, and Time Period allows the data analysis service to order symbols with greater efficiency. Ordering the numbers as strings can produce a different result than using the actual number under alphanumeric ordering. For example, the numerical symbols shown in symbol file 204 are sorted as numbers (1, 2, 3 ..., 9, 11), rather than as strings, which would produce (1, 11, 2, 3 ... ).

In one aspect, once the symbols have been reduced and organized, the symbols may be concatenated with a delimiter. In the example shown, the symbols in the symbol file 204 are separated by a vertical bar or pipe character "|". The symbol delimiter may be unique in the context of the symbols, and may also be reduced during the compression operation. In some aspects, each symbol in the symbol file 204 as well as localities in the locality file 206 may be represented in binary format (i.e., as 0 and 1) for improved compression.

The file converter 110 may generate a locality file 206 containing each location of each symbol. The locality file 206 represents the structure of the modeled source (e.g., raw data source). The present disclosure uses the term "position" to refer to a locality within the source file—and the mirrored localities in the locality file—distinguished from the term "location" which is used to refer to a locality or coordinates within the symbol file. If a symbol is in the source file 200 more than once, a new value (representing a symbol location) is added. As shown in FIG. 2, each symbol in the symbol file 204 has a corresponding location (within the symbol file). For example, the symbol "1" is located at location "01"; the symbol "A", at location "09"; and the symbol "L" at location "20" of the symbol file. The position (within the locality file) of a location value is mirror of the raw source file 200. In other words, the locality file 206 may be similar to the source file 200 except that in place of the actual symbol, the locality file 206 has a value representing the location of a particular symbol within the symbol file 204.

For example, in the first row, first column, the locality file has a location value "09" in place of the symbol "A" found in the corresponding position in the source file. In another example, in the first row, third column, the locality file has a location value "13" in place of the "E" symbol found in corresponding spot in the source file. In yet another example, the locality file contains two instances of the location value "05" to represent the two separate occurrences of the symbol "5" in the source file 200.

In one aspect, a location value may be implemented as an integer value that is a simple index or offset relative to the symbol file. For example, a location value "01" represents a first-ordered position in the symbol file. In other aspects, a location value may be coordinate values (e.g., x-y) of a symbol within structured data. In yet other aspect, a location value may be an address of a symbol contained with the symbol file. In some aspects, the location values may be fixed in size (i.e., expanded by adding prefix 0's), and also represented in binary (0s and 1s). The fixed size may allow for a more efficient processing protocol because fixed size fields may have a reduced overhead. In other words, simplified math may be used to find a given symbol in a data source file.

According to an aspect, the converted file format comprised of a symbol file and a locality file may be configured to support lossless compression. That is, the original source file can be recreated from the encoding in the data edge file. For example, to reproduce the original data source, the locality file can be scanned, each location value is used as a lookup index in the symbol file, and the location value is replaced with the retrieved symbol.

Aspects of the present disclosure may store and compress data to its theoretical minimum, e.g., if a data file was compressed using some standard compression tool (e.g. gzip), the resulting file would achieve that particular algorithms theoretical minimum. Unique to Data Edging is its ability for adaptive/intelligent organization of the derived locality and symbol files such that it can compress the data source "below" this theoretical minimum, e.g., even when using the same compression algorithm (e.g. gzip). And yet, in the data analytics world, additional information is added to make information retrieval-performant. This overhead can be greater than the theoretical minimum the file could achieve and at big data scale can be a tremendous cost. This cost is particularly dubious when cataloguing (i.e. indexing) is required to speed up an ever increasing number of specific result set retrievals.

In contrast, the data edge aspects described herein adaptively and/or algorithmically categorize all symbols of a file, unlike other formats where they have to be specified either explicitly or implicitly. And as mentioned previously, indexing is costly with respects to size and time to process. Increasing the amount of indexing slows down the ingestion of a data source, at some point, causing the data organization to virtually stop. A data edge file formats data differently, e.g., with storage format categorizing and compressing as one intrinsic act.

As described above, in some aspects, the compression algorithms may have some difficulty finding patterns when the distance between those patterns is large or disjoined. As a result, the localities in the locality file may be ordered by a row or column orientation, as shown in FIGS. 3A and 3B, respectively, or even by diagonal orientation. FIG. 3A depicts one representation of a locality file 300A in a row-based orientation, having the locations of symbols in the first row, sequentially, followed by the locations of symbols in the second row, and so forth. In these figures, and in Figures to follow, the location value is represented in generic terms such as "Location of A", for clarity of illustration. FIG. 3B depicts a representation of a locality file 300B in a column-based orientation, having the location values of symbols from the first column of the source file, sequentially, followed by the location values of symbols from the second column of the source file, and so forth.

Figure 4:
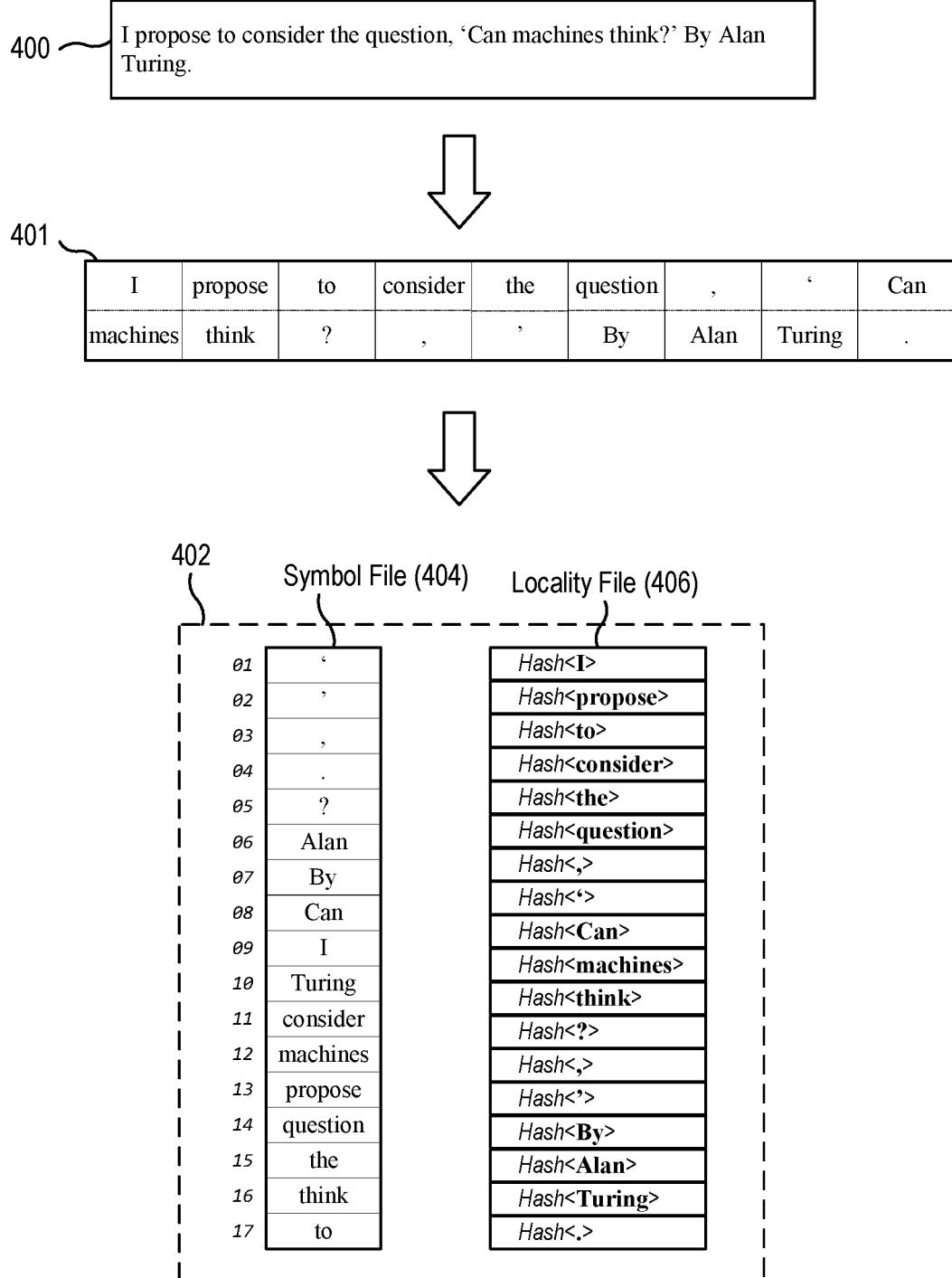
FIG. 4 is a block diagram depicting a conversion of an unstructured data source file to a data edge file according to an example aspect.

FIG. 4 is a block diagram depicting a conversion of an unstructured data source file 400 to a data edge file 402 according to an example aspect. The source file 400 may be a document file having a plurality of text data, such as in plain text files (.txt), rich text format (.rtf), and other document file formats. As used herein, "text data" is a generalized, superset term for a data source that contains a plurality of Strings, and may also contain any combination of plain (not binary) symbols such as Strings, Numbers, Dates, etc. In the example shown, the source file 400 includes a text sentence:

I propose to consider the question, 'Can machines think?' By Alan Turing.

In one aspect, the data edge format may represent text sources as a continuous stream of data (i.e., left-to-right, up-to-down). It can be seen as a one-dimensional array, where numbers and words are symbols, and (most) special characters are symbols as well (i.e., one column of rows of symbols). Classical text separators, such as spaces, line breaks, tabs, and other whitespace characters, may be used as symbol delimiters. The block 401 depicts a tokenized intermediate version of the text source 400 in which the symbols have been separated by the delimiters.

In one aspect, the file converter 110 may generate a symbol file and locality file in a manner similar to the technique described earlier with regards to structured data. The file converter 110 may create a symbol file 404 associated with the source file that contains each unique symbol found in the source file 400 in a sorted order (e.g., the symbols "Alan", "By", "Can", "I", "Turing", "consider", "machines", "propose", "question", etc., as well as punctuation symbols). The file converter can discard or disregard duplicate symbols (such as the second occurrence of the comma symbol ","). In the end, the symbol file 404 is a sorted array of delimited characters, and the locality file provides the location of those characters in the raw data source (similar to the format of the locality file described earlier). In some cases, this representation may be the most optimal from the standpoint of compression.

Alternatively, the data analysis service 106 may use another mode of representation that allows for unique and optimal text query execution. Since text files are generally smaller than machine-generated files (such as CSV, log files, JSON, and XML data sources), and classic text indexing technology dramatically increases the storage of raw text, this alternative mode of representation is still significantly smaller than traditional text indexing technology, such as an inverted index, as made available in the Apache Lucene software project.

As shown in FIG. 4, in one aspect, the file converter 110 may generate a locality file 406 where the locality is not the coordinates (x,y) of the location of the corresponding symbol in the source file, but rather a fingerprint value (e.g., hash) of the symbol itself. The position of a hash value within the locality file 406 represents the position of the corresponding symbol in the raw text source file 400. For example, the position of the hash value for the symbol "consider" in a fourth position of the locality file 406 indicates that the symbol "consider" is found in a fourth position of the original data file. This variation of representing the locality file enables the locality file to be used for text-based search without needed to refer to the symbol file. If the locality file contains hashes of symbols (rather than their coordinates), then a symbol lookup need only analyze the locality file.

According to aspects, the mapping of hash-to-symbol can be inferred since reproduction of a raw source is available by hashing the corresponding symbols. Lossless compression is still supported in this variant aspect. The original raw source can be recreated by hashing the symbols in the symbol file, and with these hashes, reproducing the structure of the source by matching the hashes in the locality file. The advantage of using the hash is that the locality file 406 no longer needs to reference the symbol file 404 to answer text query operations regarding the text data. Additionally, since locality files are essentially matrices of numbers, high performance multidimensional mathematical libraries (e.g., linear algebra operations) can be used, as well as, simple and fast bitwise operations (e.g., bit map operations). For instance, the data analysis service 106 may take a symbol or phrase of symbols, convert them into hash values, and then search/position them into these matrices.

The file converter 110 may use various hash algorithms to generate a value for each symbol in a source file 400. As one example, the file converter 110 may use a hash algorithm, such as MetroHash, to generate the fingerprint value corresponding to each symbol identified in the source file 400. In some implementations, the fingerprint value may have a size of 64 bits or more to reduce the likelihood of hash collisions. In some aspects, the data analysis service 106 may further maintain a hash lookup table (e.g. hash to count) to reduce the size of locality files. It should also be noted that any language can be represented in the data edge file format. In other words, the outlined directional flow of data edge files is an internal representation and has no adverse effects with respect to reproduction and/or symbol search/position.

For well-formed structured data sources (e.g., CSV) that are of basic data types (e.g. Boolean, number, string), a 2-dimensional locality model may suffice (see FIG. 2 above). However, as data sources become more complex, additional dimensions may be added. For instance, the data edge file format may model text column sources as a new dimension per each row. The reason is that each text row column can have a different format and shape, even though conceptually it is perceived as the same column. Text data may be considered an array type of symbols, and when part of a complex data source, may be designated with its own dimensionality. In other words, a change of shape for a data source can introduce a new dimension to the model of the data source. And yet, the representation of dimensions, both in memory and on disk, can be represented using a one dimensional array, partitioned into n-number of dimensions.

One can view each one of these dimensions as a vector space, where a vector is a directional sequence of points. Thus, a locality is a data point, as part of a vector, describing a data source structure. And to reiterate, locality is what models the format and shape of a data source. Symbols, on the other hand, may be represented without relationship to a data source's format and shape. Instead of merely representing symbols as one-dimensional, dimensions can be introduced based on the type of symbol (e.g., Booleans, numbers, strings, and dates are all different vectors).

Figure 5:
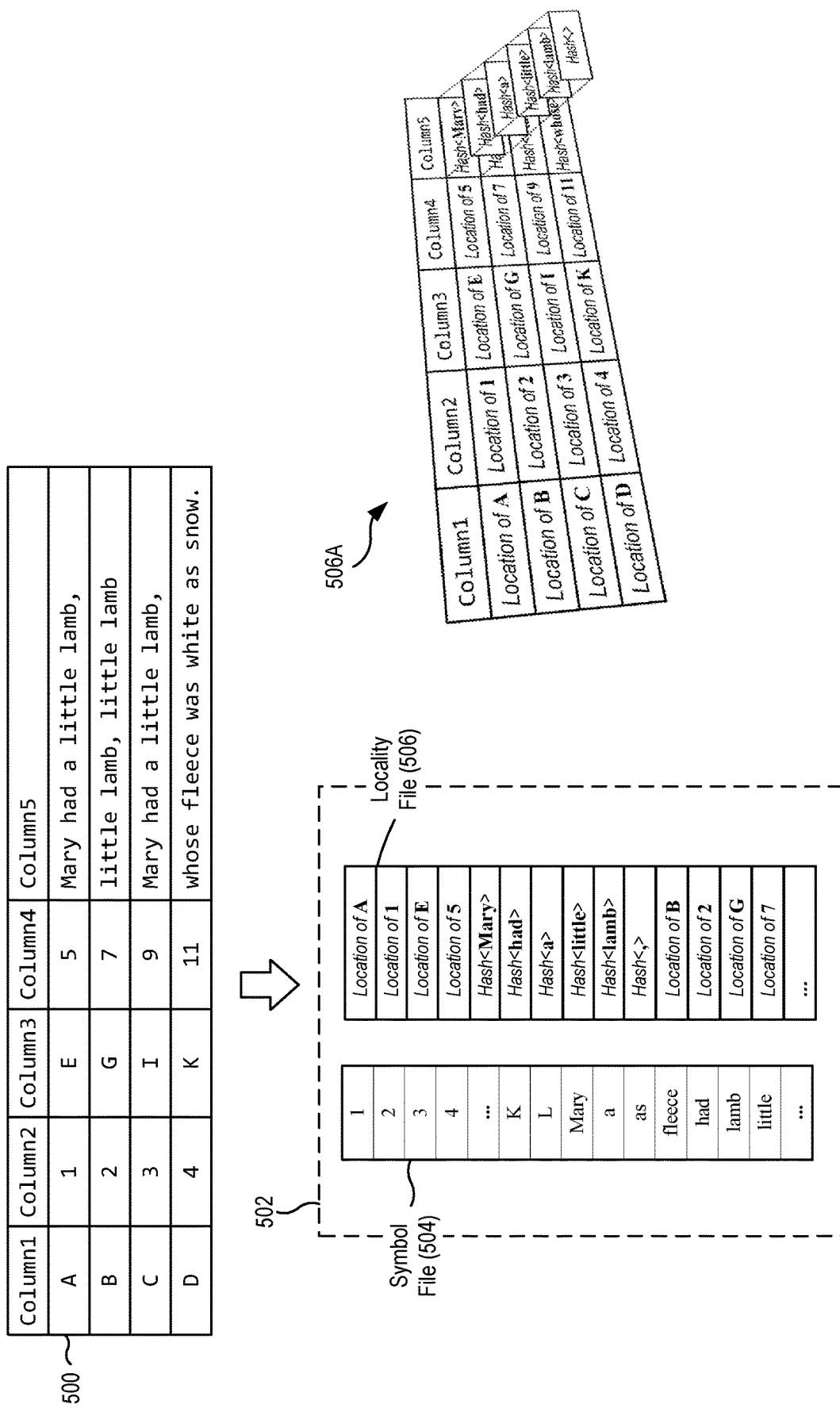
FIG. 5 is a block diagram depicting a conversion of a structured data source file having text data to a data edge file according to an example aspect.

FIG. 5 is a block diagram depicting a conversion of a structured data source file 500 having text data to a data edge file 502 according to an example aspect. The source file 500 is similar to the example structured data source file 200, except that for the presence of a column of text data (i.e., "Column5"). In contrast to the other columns of data having simple data types (e.g., "A", "1", "E", "5"), the text column includes sequences of text (e.g., "Mary had a little lamb").

The data edge file 502 for the structured data source file 500 having a text column may include a symbol file 504 and a locality file 506. The file converter 110 may create the symbol file 504 associated with the source file that contains each unique symbol found in the source file 500 in a sorted order. As shown, this includes symbols of the basic data types found in the columns 1-4 (e.g., "A", "1", "E", "5"), as well as symbols parsed in the text column (e.g., "Mary", "a", "as", "fleece", "had").

The file converter 110 may further create the locality file 506 having a combination of location values indicating the location of each symbol in the symbol file 504, as well as fingerprint values of symbols from the text column. The positions of the location and hash values are mirrors of the raw data source 500. For example, the locality file 506 contains, at a first position of the locality file itself, a location value (depicted generically as "Location of A") representing where the corresponding symbol "A" can be found in the symbol file 504. In a further example, the locality file 506 also contains a plurality of hash values for symbols of text data at a position within the locality file 506 corresponding to Column5. The locality file 506 for a structured data source may be modeled as a two-dimensional structure corresponding to the rows and columns of the structured data source, with the addition of a third dimension corresponding to a sequence of text data found in at least one of the cells. In other words, a CSV can be a two-dimensional matrix where the text column can be viewed as a third dimension starting at the location of the row and column coordinates. This three-dimensional concept is depicted in the form of the locality file 506A shown in FIG. 5.

The conversion of semi-structured data sources (e.g., JSON and XML) into a data edge file may follow all the same principles that have been discussed earlier for unstructured data sources (e.g., Text) and structured data sources (e.g., CSV, log data sources) and their combinations thereof.

Figure 6:
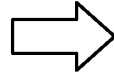
FIG. 6 is a block diagram depicting a conversion of a semi-structured data source file to a data edge file according to an example aspect.

FIG. 6 is a block diagram depicting a conversion of a semi-structured data source file 600 to a data edge file 602 according to an example aspect. The example source file 600 is a JSON file having data in the form of a plurality of name-value pairs that describe an entity (e.g., "Company X"). In the example shown, the JSON data includes data specifying a name field, an address field, and an employees field (which contains an array of employee names).

In one aspect, the semi-structured data source 600 may be transformed into a two-dimensional representation. First, the file converter 110 may generate a flattened representation 601 of the semi-structured data. In one aspect, the flattened representation 601 may include a plurality of columns corresponding to the keys of the JSON object, and a row of data corresponding to values of the JSON object. In the example shown, the "name" field is transformed into a first "name" column. The "address" object is transformed into separate columns, each column representing a name-value pair in the address object (e.g., "address.street", "address.city", "address.state"). The "employees" array is transformed into separate columns, each column for each element in the array (e.g., "employees[0]", "employees[1]", "employees[2]").

After generating this two dimensional structure 601, the file converter may proceed to generate a symbol file and a locality file associated with the semi-structured data source 600. Similar to the earlier examples, the file converter 110 may create a symbol file associated with the semi-structured source file that contains each unique symbol found in the value data of the name-value pairs of the semi-structured data, in a sorted order. The file converter 110 may further create a locality file containing the location values of the symbols in the symbol file.

It should be noted that both JSON and XML (by definition) cannot be malformed and would be considered invalid. These data sources are described as semi-structured. In the case of processing an invalid JSON/XML data source, the file converter 110 will model it as a one dimensional text array and can be considered unstructured (i.e. a list vector of directional symbols).

In another aspect, the data edge representation of complex structures such as JSON and XML is simply an extension of the same multidimensional description, constructs, and rules as discussed earlier. For instance, JSON can be viewed as a human readable data format and can be viewed as an object, but without the methods. In other words, these structure can model Booleans, numbers, strings, arrays, and maps (i.e. objects), as well as, any combination thereof In one aspect, in the case of log-file data sources, there is typically an underlying structure for each line of log records. In other words, log files are similar to CSV files where this said structure is the delimitation. As a result, a data edged representation of log files can be treated similarly to the aspects described in conjunction with CSV files. When there is a line that has no discernible structure (i.e. like delimitation to other lines), these symbols can be viewed as text. And like CSV with text, the data edging follows an identical process for representation.

It should be noted that most, if not all, relational analytic databases do not support text types or text search, nor does text search database support true relational operations. The support of both relational and text queries by aspects of the present disclosure, in one technology, has significant benefits both from a cost and complexity perspective.

Using the data edge file format, the file converter 110 can model these types and combinations. Types such as basic types (e.g. Boolean, number, string, and date) are identified as symbols, with each having a locality of reference. An array of types may be the same construction as the Data Edge text (symbols) based on a one dimensional array. A map is an object data type that associates a symbol with another dimension that can be another symbol, list, and/or map. In the case of a map, the locality is a special locality that references the symbol and another locality of reference.

Figure 7:
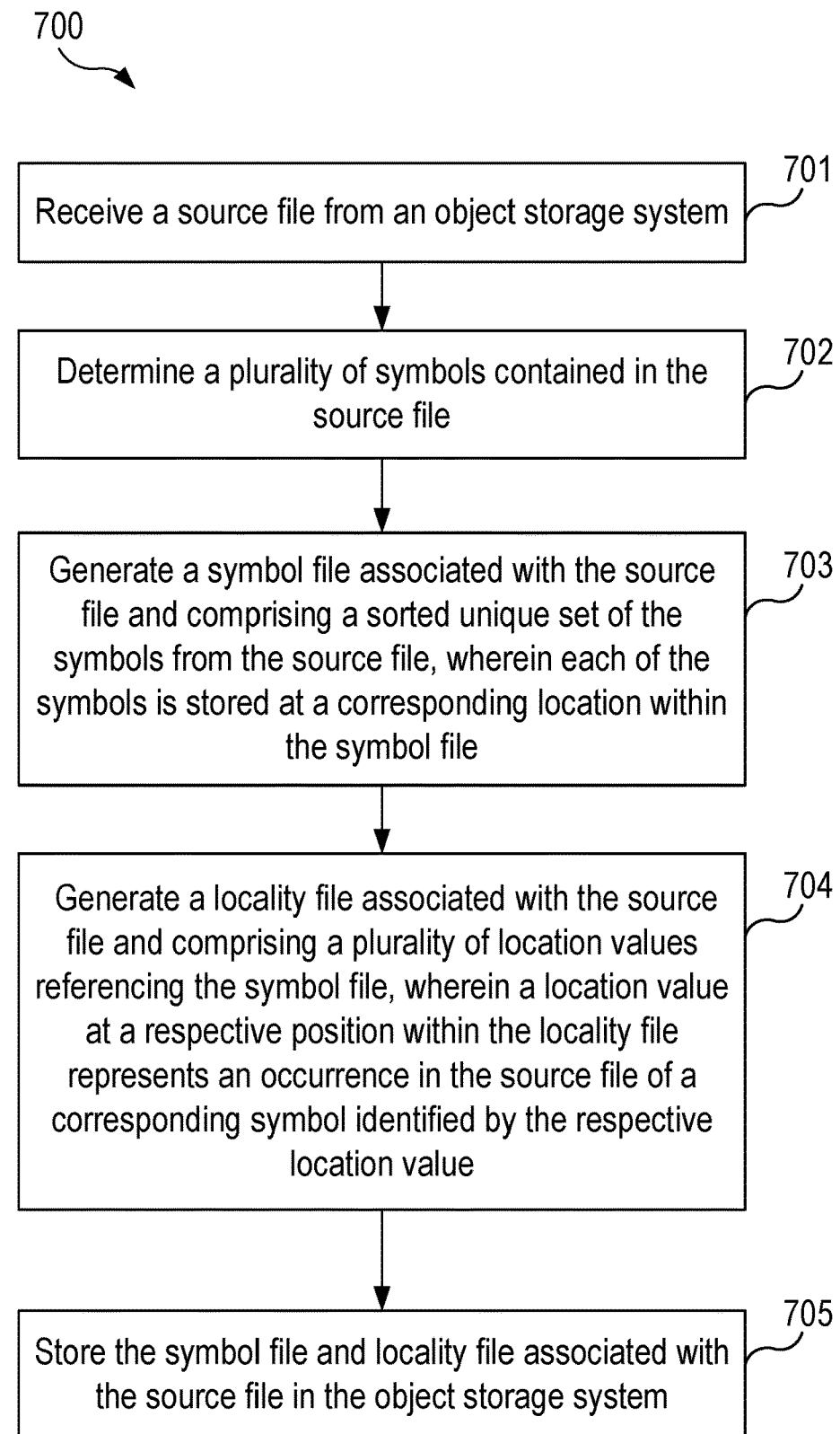
FIG. 7 is a flowchart illustrating a method for processing and storing a file in object storage according to an example aspect.

FIG. 7 is a flowchart illustrating a method 700 for processing and storing a file in object storage according to an example aspect. The method may be performed by the data analysis service 106, by a sub-component of the data analysis service 106, such as the file converter 110, or by the object storage system 103. It is noted that the following description of the example method makes reference to the system and components described above. The method 700 for processing and storing a file in object storage enables improved compression rates of object data due to the separation of symbol and locality.

The method 700 begins at step 701, which a data analysis service 106 (e.g., using a file converter 110) receives, from an object storage system 103, one or more source files 115. In some aspects, the receipt of the source files is triggered by user input that selects a bucket in which the source file is contained. In some use cases, the user may select that bucket for discovery, analysis, and/or indexing. In other aspects, the receipt of the source file is automatically triggered in response to detecting the creation or modification of the source file in object storage.

The file converter 110 may convert the received source files 115 to a data edge file format to facilitate later discovery, refinement, and query operations. For example, FIG. 2 illustrates an example of conversion of a source file having structured data such as CSV files into at least one symbol file and at least one locality file. In another example, FIG. 4 illustrates an example of a conversion of a source file having unstructured data such as text data into a symbol file and a locality file. In yet another example, FIG. 5 illustrates an example of a conversion of a source file having structured data with a text column into a symbol file and a locality file. Finally, FIG. 6 illustrates a conversion of a source file having semi-structured data such as JSON and XML files into a symbol file and a locality file.

At step 702, the file converter 110 determines a plurality of symbols contained in the source file. The file converter 110 may scan through the file to identify individual symbols contained in the source file, using some predetermined character(s) as delimiters between symbols (e.g., such as whitespace). At step 703, the file converter 110 generates a symbol file 122 associated with the source file 115 and comprising a sorted unique set of the symbols from the source file. Each of the symbols is stored at a corresponding location within the symbol file. In some aspects, the sorted unique set of the symbols in the symbol file are concatenated together with a delimiter.

At step 704, the file converter 110 generates a locality file 124 associated with the source file 115 and comprising a plurality of location values referencing the symbol file. A location value at a respective position within the locality file represents an occurrence in the source file of a corresponding symbol identified by the respective location value. In some aspects, the source file may comprise structured data, and the location values are ordered within the locality file by one of a row orientation or a column orientation. For example, the source file comprises at least one of a comma-separated values (CSV) file having a plurality of records, each record comprising a plurality of fields separated by a delimiter character.

In one aspect, the file converter 110 may identify a type of data contained in the source file, for example, based on a file extension of the file, based on metadata associated with the file identifying the type of data, or based on an inspection of the file itself. Responsive to determining that the source file comprises unstructured text data, the file converter 110 may generate a plurality of fingerprint values based on the determined plurality of symbols contained in the source file. The file converter 110 may then generate the locality file comprising the plurality of fingerprint values. A fingerprint value based on a corresponding symbol and at a respective position within the locality file represents an occurrence in the source file of the corresponding symbol.

In another aspect, responsive to determining that the source file comprises semi-structured data, the file converter 110 may transform the semi-structured data into a two-dimensional structure prior to generating the locality file. In one example, the source file comprising semi-structured data is formatted as at least one of a JavaScript Object Notation (JSON) file, and an extensible markup language (XML) file.

At step 705, the file converter 110 stores the symbol file and locality file associated with the source file in the object storage system 103. In some aspects, the file converter 110 stores the symbol file and the locality file in a same bucket 108 as the source file in the object storage system. In other aspects, the file converter 110 may store the created symbol and locality files in a separate bucket as the source files in the object storage system. In some aspects, the file converter 110 may generate a data edge file 120 that is comprised of the symbol file concatenated with the locality file. In some aspects, the data analysis service may generate and render a graphical user interface that indicates the contents and associated statuses and metadata associated with the content stored in object storage. In response to storing the symbol and locality files associated with a source file in the object storage system, the data analysis service may modify the graphical user interface to indicate that the associated source file is now available for further data query and analysis. In some aspects, the data analysis service 106 may search the source file by querying the locality file associated with the source file, as described in greater detail below.

Data Edge Materialization and Virtualization

Aspects of the present disclosure further provide techniques for data virtualization and materialization of data in object storage using the data edge file format described herein. The data edge system indexes object storage where data is an object that can represent one or more entries (i.e., rows) and where these objects can be grouped together to make a dataset. The described techniques for data edge materialization provide an approach to manipulating indexed data, as well as resolving analytical text search and/or relational queries. In other words, based on data edge indexing, the described techniques provide the ability to quickly and easily transform and/or assemble answers for a request in a dynamic manner and at scale. Additionally, aspects of the present disclosure include features of both data virtualization and view materialization, and include the ability to dynamically shape, aggregate, and correlate data to be used to resolve analytical requests. The term "materialization" is used herein as the overarching name for both data virtualization and view materialization capabilities since all aspects of known extract, load, and transform (ETL) processes can be characterized as virtual and lazy (i.e., late materialization).

According to one aspect, data edge virtualization is implemented using a concept of a "virtual bucket." Virtual buckets are an abstraction layer on top of object storage that acts as a logical lens or view into data sources and supports multiple modeling functions, including aggregation, transformation, and correlation. Virtual buckets may be live and linked to "physical" buckets, which means when a physical bucket (i.e., bucket 108) is updated, the associated virtual buckets can be updated as well, on the fly. Additionally, unlike a traditional extract, transform, load ("ETL") process in which data is loaded into a separate data warehouse, the data inside virtual buckets remains in place within the user's object storage. A virtual bucket can be seen as a logical description similar to that of a relational table, but geared towards object storage bucketing constructs. In other words, a virtual bucket is a schema that describes a data source's initial representation (raw) and/or a new transformation (e.g., shape, aggregate, correlate). This relation is on-demand and lazy (i.e., late). In other words, its construction is on the fly and built using the current state of one or more data edge indexes where the materialization aspect of the description takes the representation or transformation and feeds it to search and/or query resolution logic.

In an aspect, data edge materialization is the realization of a result set based on data edge indexes, either fed by the initial representation and/or potential transformations to resolve a particular search request and/or query of data stored in object storage. All such materialization requests are based on virtual bucket datasets, where a request can be a combination of predicates (i.e., database functions) referred to herein as a query plan. In other words, a query plan can be a sequence of functions that take the virtual bucket dataset and sorts/reduces it to a final (potentially smaller) result set.

Figure 8:
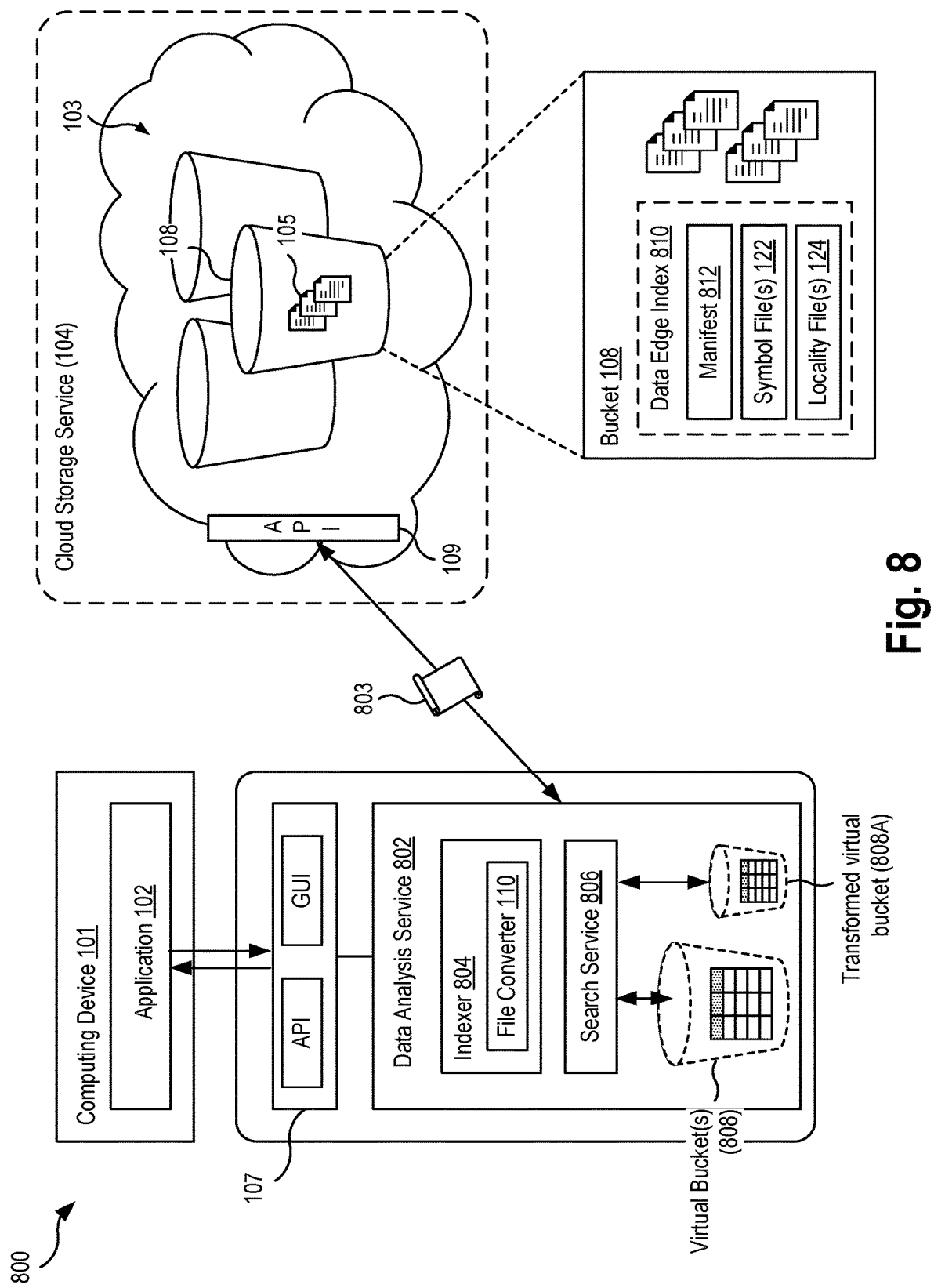
FIG. 8 is a block diagram illustrating a system for indexing and searching data stored in object storage according to an example aspect.

FIG. 8 is a block diagram illustrating a system 800 for indexing and searching data stored in object storage according to an example aspect. The system 800 is similar to the system 100 described earlier, except for the inclusion of several components to depict the data materialization aspects in greater detail. Similar to the system 100, the system 800 includes a computing device 101 executing an application 102 that has stored data 105 in an object storage system 103. The object storage system 103 is configured to store units of data 105 as objects in a flat organization scheme with logical containers known as buckets 108.

The system 800 further includes a data analysis service 802, similar to the data analysis service 106, configured to process and analyze the data 105 stored in the object storage system 103, such as historical log and event data. The data analysis service 802 includes an indexer 804 configured to generate at least one data edge index 810 based on one or more data sources (e.g., data 105), which are similar to the converted files 120 described earlier. In some aspects, the indexer 804 may utilize a module such as the file converter 110 described earlier for processing one or more data sources within the object storage system 103 into the described data edge file format. In some cases, the indexer 804 may read the raw data from object storage, and create the data edge indexes 810 which are then stored back in the object storage. All queries are processed based on these indexes, and no raw data is read to resolve any particular query request. In other cases, the indexer 804 reads the raw data from another source (i.e., not object storage), and stores the resulting indexes in object storage. It is understood that FIG. 8 depicts a single instance of the indexer 804 for illustration purposes only, and that the operations of the described techniques are able to be performed by a distributed system in parallel. As described in greater detail below, the system may execute multiple instances of the indexer 804 to convert a vast amount of data in object storage 103 to the described data edge format.

The data edge index 810 is an indexed form of the one or more data sources. In an aspect, the data edge index 810 includes at least one manifest portion 812, one or more symbol portions 122, and one or more locality portions 124. The manifest portion 812 contains schema information, statistics, metrics, and other metadata related to the original data source(s), to the data edge index, and to the indexing processing performed. The symbol portions 122 contain all the symbols found in a data source file (e.g., ordered internally). The locality portions 124 contain values representing the respective locations of those symbols in the original data sources (i.e., raw/refined source). As described in greater detail below, the combination of the manifest, source, and locality files are used to optimize access to object storage, where each component file is used to resolve a materialization request with reduced time, size, and cost metrics (i.e., how long does it take to index a data source, of what size is the resulting index, and at what cost) compared to known techniques. As described later, during the indexing process, a root and branch type data structure can be generated to summarize multiple manifest files 812 of a single data edge index, such that several manifest files are combined or summarized into leaf nodes.

In one aspect, the manifest file(s) 812 may include statistics and metrics about the indexed data, which were compiled during the indexing process, and may be updated as a result of any refinement or transformation operations performed on the data edge index. Such statistics which provide enough information to either resolve a specific request and/or scope (i.e., reduce) object storage access, without accessing to access the underlying symbol files, locality files, or raw source data, or at least with reduced accesses compared to the known techniques. The statistics may include information about the type or format of a source file 115 (e.g., CSV, JSON, XML, log file, etc.), and information indicating the type(s) of data in the source file 115 (e.g., structured, semi-structured, unstructured, Strings, Numbers, text data). The statistics may further specify any structure(s) in the data sources. In an aspect, the statistics may specify, for each column of data in the underlying data source, a "minimum" and/or "maximum" symbols which are the symbols that would be first in sequence and last in sequence, respectively, if all the symbols in a data range (e.g., a particular column) were in a sorted order. In one aspect, the data analysis service 802 may calculate statistical functions of the source data, such as the minimum, maximum, average, mean, cardinality, standard deviation, and count of a particular column in the data source.

The data analysis service 802 publishes the indexed data source(s) as a virtual bucket 808, which are configured similar to the physical buckets 108 (i.e., supporting a similar flat hierarchy and organization) but that also support execution of analytics and search queries, such as text searches and relational queries. That is, a virtual bucket 808 is a logical and virtual container for data 105 that is stored in physical buckets 108 of the object storage system 103 (i.e., data in a single physical bucket, data across multiple physical buckets) and that has been indexed in the form of a data edge index 810 to support the execution of text search and relational queries on that data which is not conventionally available in object storage systems. The virtual bucket 808 may be defined, in part, by an internal schema and sort order (e.g., as specified in the manifest portion 812) thereby providing materialization and data virtualization features to the data stored in object storage.

In one aspect, the data analysis service 802 may provide a graphical user interface that displays the data sources stored in object storage and that provides an interface through which the user can analyze and run queries on the data sources. The graphical user interface of the data analysis service 802 may enable a user to access the virtual buckets 808 and the data sources contained therein, rather than be limited to displaying the content of each individual physical buckets. After data source(s) have been indexed and published as a virtual bucket, the data analysis service 802 may use the indexes to display statistics related to the underlying data sources, as well as provide a form user interface elements for the submission of a search query to be executed on the data index.

In an aspect, the creation of virtual buckets 808 can have two origins. First, a virtual bucket 808 may be created (e.g., by the indexer 804) as the initial data edge index 810 of object data, having a schema and sort order is the lossless state of the original raw sources (data 105). In other words, the materialization of this index, which is akin to a relational database generalized selection (i.e., "SELECT *"), will reproduce the exact raw source state of data 105. Secondly, each data edge index 810 may be refined using one more transformation operations, which creates a new virtual bucket 808A that is named and can be seen as a new data edge index that can be analyzed and/or used as another index to be refined again. For example, a data edge index 810 may be transformed by a change in schema types (i.e., columns), a change in schema type names, a change in the order or shape of the schema, a change in the data set sort order by type, or an aggregation or correlation between two or more indexes 810. The transformed data edge index may be implemented by a modification to the existing manifest or creation of a new manifest, while the linked-to data edge symbol and locality files remain unchanged. In an aspect, all transformations are essentially only descriptions where each description can be applied in sequence to produce the desired data set. Each transformation operation may be executed on-demand. That is, a new manifest file that describes or specifies new transformations, aggregations, correlations, or sort orders, and any combination thereof can be executed on the data edge symbol and locality files dynamically and in a desired sequence to produce a certain data set.

The system 800 includes a search service 806 configured to receive one or more search or analytics queries (803) for the data stored in one or more virtual buckets 808. The search service 806 is configured to execute the queries 803 on data in a virtual bucket using the data edge index 810 associated with that virtual bucket, including an analysis of the manifest portions 812, the symbol portion(s) 122, and the locality portion(s) 124. The unique arrangement and structure of the data structures in the data edge index 810 advantageously enable the described system to quickly perform such operations on data stored in object storage compared to known techniques.

As an overview, the search service may use the symbol files 122 to determine if a word and/or phrase is present within the indexed data, and may use the locality files 124 to determine the structure of the resulting dataset. Searching the symbol files may involve performing a binary search, unique scanning, and/or other suitable search algorithms. As discussed below, the symbol files 122 contain a number of times (i.e., hits) a symbol exists in the associated locality file. If no wildcards are contained in the search, a binary search may be performed to find/search for the existence of the specified symbol in the symbol file. If wildcards are contained in the search request, a binary search can be performed to process a prefix portion of the search request (i.e., the search term up to the wildcard), and then unique scanning may be performed to handle the remainder of the search term. Prefix wildcarding includes unique/optimized scanning. that the performed scanning may be unique because it is a stream- or bit-based search without restart, and because it hits a threshold of collections. Thresholds may be applied to stop location collection and to proceed to the locality file to continue the scan.

In one aspect, the handling of the search query may differ depending on the format of the locality files. The locality file 124 can use a format of symbol/positions as described earlier in conjunction with FIGS. 2 and 3A-3B, or a format using a unique hash of a symbol as described earlier in conjunction with FIGS. 4 and 5. If symbol positioning is used, the symbols may be used to "find" existence (which supports all search types). If a locality file uses hashing, then word/phrase matching can be used (i.e., wildcarding might not be allowed, no unique hash). A hash can be considered a one-dimensional integer identifier of a string (e.g., symbol). In other words, for a symbol a unique integer (hash) can be created based on a hash algorithm where an integer-find operation is faster than a string-find operation. In an example in which there is a symbol "CAT" and the associated identifier is the value 123, the search term "C*T" with the wildcard character "*" can match many possible symbol combinations (e.g., CQT, CWT, CERVT, etc.), but the identifier for each combination would have a different identifier than the value 123. As such, the hashing in the locality file provides an optimization for generic text search algorithms based on data edge symbol/locality representation. Locality based on symbol positions may be generic and can be extremely optimized from a binary search and brute force method. Hashing can skip all the symbols searching for word and/or phrase since during the structuring of result set phase of locality has the computed hash.

In an aspect, the search service 806 is configured to execute one or more queries for the analysis of data in a virtual bucket, including text search and relational queries. Each of these aspects can be used to feed the other as part of a query plan. For example, the search service 806 may use a text search operation to first filter a large dataset into entries that can be analyzed via relational functions. In an aspect, the search service 806 may execute a text search having a term matching clause, a wildcard matching clause, and/or one or more Boolean operators on a virtual bucket of data stored in object storage using the manifest portion 812 and/or symbol portions 122 of the data edge index associated with that virtual bucket. For example, the search service 806 may execute a text search that includes a term matching clause specifying a text term (e.g., a string literal, text value) and returns a result set from data stored in object storage that matches the specified text term. As used herein, the data stored in object storage includes data edge files stored in object storage which represent the actual raw data in object storage. In another example, the search service 806 may execute a text search that includes a wildcard matching clause that specifies a search expression having a wildcard and returns a result set from data stored in object storage that satisfies the search expression. In another aspect, the search service 806 may execute a relational query on a virtual bucket of data stored in object storage using the manifest 812, symbol file(s), and locality file(s) of the data edge index associated with that virtual bucket. Example relational functions of a relational query that may be executed on a virtual bucket may include a SELECT, DISTINCT, ORDER BY, GROUP BY, RANGE BY, FIND UNTIL, and INNER JOIN operation as well as text search functions such as match, match_phrase (i.e., for matching exact phrases or word proximity matches), multi_match (for multi-field queries), range (for matching documents with fields that have terms within a certain range), text search include/exclude operations, and wildcard (*) operators. Each relational function can be combined with any other function to create a query plan to resolve both text search and/or relational query, or any combination thereof.

In one aspect, search service 806 may be configured to drive access through a workflow that includes a sequence of manifest file, then symbol file, then locality file of a data edge index. This approach improves the functioning of existing search and analysis systems by decreasing or limiting the amount of object storage access requests that are required to resolve a materialization. The search service 806 may use the manifest file 812 to first scope the symbol files, which are then used to scope the locality files. That is, the manifest files 812 may be used to determine where the data is (i.e., thus allowing the search service to efficiently fetch the particular symbol files or locality files that can answer a request), as well as answer certain requests (using the metadata and statistics contained in the manifest file) in some cases without needing to retrieve or access the symbol file or locality files at all. In other cases, the search service 806 may first access the manifest file 812 and then access the locality file (i.e., without accessing the symbol files) in situations in which certain symbol materialization is not needed. That is, in cases in which symbol files are only needed to materialize the result set (i.e., locality to symbol mappings), the access of symbol files can be skipped.

Figure 9:
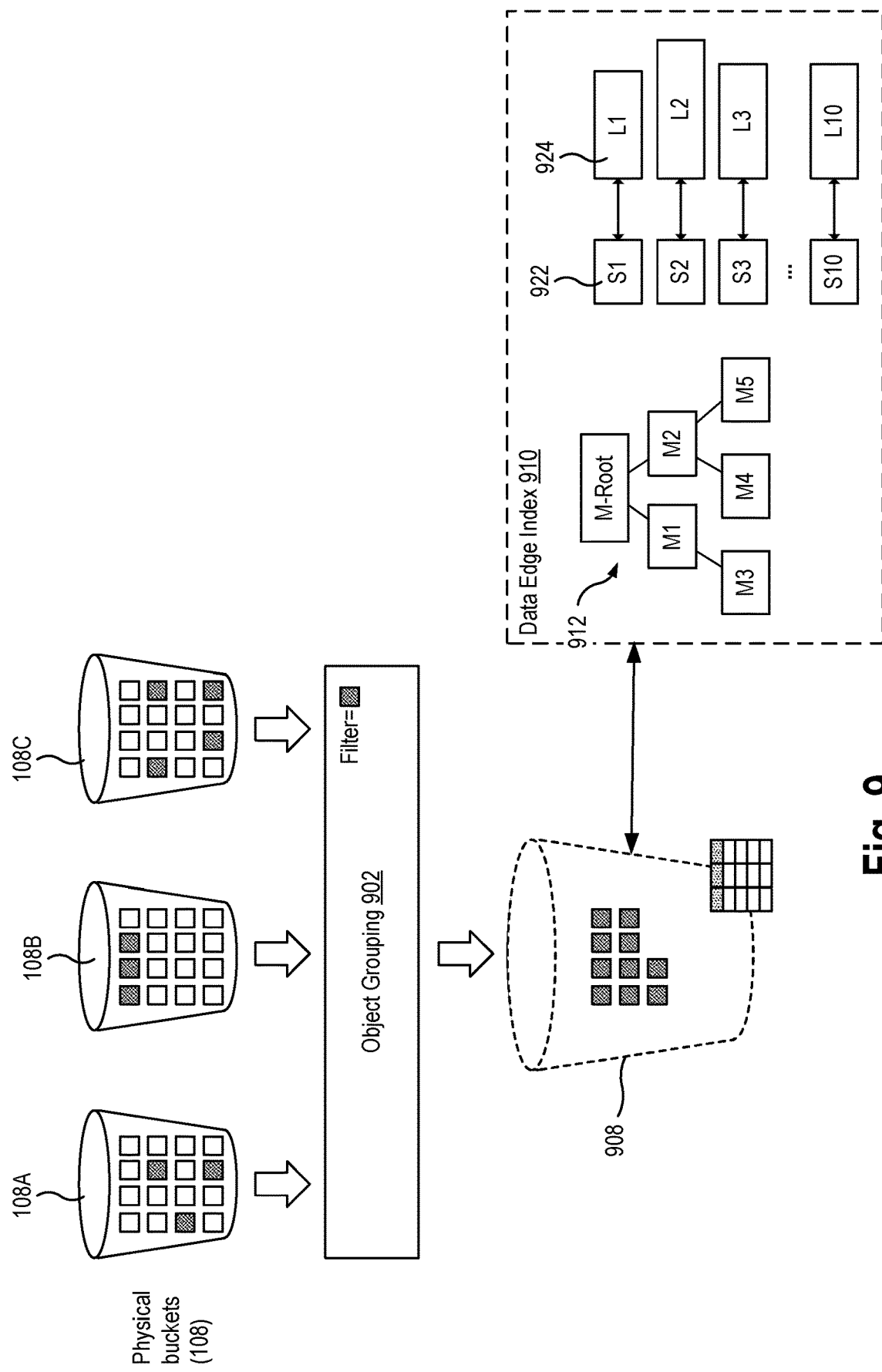
FIG. 9 is a block diagram depicting the indexing of data stored in object storage and creation of a virtual bucket according to an example aspect.

FIG. 9 illustrates operations for organizing and indexing data sources into virtual buckets, according to an aspect of the present disclosure. To form a virtual bucket 808, the data analysis service 802 introduces a new construct referred to herein as an object grouping 902. The data analysis service 802 may define one or more object groupings 902 within the object storage system 103 to select and/or filter which data objects should be included within a data edge index. Once data objects have been indexed, the data analysis service publishes these indexed groups as virtual buckets 808, which can be further refined and/or analyzed. The virtual buckets 808 act as a lens into analyzing data in object storage. The use of virtual buckets improves the functioning of the computer storage system by removing the necessity of moving data out of object storage for ETL and data warehousing purposes, or of building complicated and costly scaffolding to use either an external text search and/or relational database. Object groupings 902 act as a form of "virtual folder" to quickly filter from a single physical bucket or to filter and aggregate data objects from multiple physical buckets into a single logical grouping. In contrast, bucket listing and filtering in known object storage systems can be extremely slow, particularly when there are millions of objects within a physical bucket 108. Object groupings 902 scope data in a physical bucket to partition out (i.e., filter out) unrelated objects in object storage. Via an object grouping, the system indexes the content. During a Discover operation performed on a physical bucket, the system indexes the metadata of the bucket via the data edge index. As a result, the object grouping 902 can issue filter requests not through conventional object storage APIs (e.g., S3) but through the data edge index, thereby providing faster operations and lower latency.

In an aspect, the data analysis service 802 may generate an object grouping 902 that specifies a criteria for filtering data objects within one or more specified physical buckets, wherein data objects that satisfy such criteria are included in a corresponding data edge index. For example, an object grouping 902 may specify a data type of only CSV files to create a virtual bucket 908 of CSV files for further analysis. In the example shown in FIG. 9, CSV files contained in the physical buckets 108A (having three CSV files), 108B (having three CSV files), and 108C (having four CSV files) are depicted as squares with a shaded background. The resulting virtual bucket 908 is constructed based on a data edge index 910 created using the ten CSV files as the underlying raw data sources. For example, the object grouping 902 may include the following data sources having structured data about a company's customers: "3M-customers.1.csv", "3M-customers.2.csv", and "3M-customers.3.csv".

The indexer 804 of the data analysis service may then generate a data edge index 910 based on processing of all the data objects filtered by the object grouping 902. The created data edge index 910 includes at least one manifest file 912 (e.g., "cs_mds") that describes the object grouping (i.e., virtual filter) used to create the data edge index as well as the schema for the associated virtual bucket 908. Using the above customer CSV example, the indexer 804 may generate a manifest that includes specifies a source schema of the data sources having six fields as follows:

First Name—String
Last Name—String
Street—String
State—String
Sex—String
Age—Number In an aspect, the manifest file 912 includes statistics and metrics about the indexed data, which were compiled during the indexing process. In some aspects, the manifest file 912 may be updated as a result of any refinement or transformation operations performed on the data edge index, which may result in the creation of a new manifest.

In some aspects, the manifest file 912 describes the associated manifest, symbol file(s), and locality file(s) backing files/topology. For example, in cases where the index is comprised of multiple pairs of symbol files and locality files, the manifest file may specify which of the symbol files is associated with which of the locality files, and that they represent which raw data source (e.g., original CSV file). In one implementation, a symbol and locality file pairing may be represented and encoded using a common file name prefix, such as the following index listing:

00002221705892834674.cs_mds # describes each manifest S/L pair
00002221705892834674.cs_i2s # symbol—1
00002221705892834674.cs_l2i # locality—1
00386293091707968143.cs_i2s # symbol—2
00386293091707968143.cs_l2i # locality—2
00420729860046531555.cs_i2s # symbol—3
00420729860046531555.cs_l2i # locality—3

The data edge index 910 further includes one or more symbol files 922 (e.g., "cs_i2s") that each contain the symbols of the indexed data sources. In some aspects, the symbol file 922 may be arranged similar to the symbol files 122 described earlier, and may be extended to include information relating to a number of hits. The number of hits specifies the number of times a given symbol occurs within a locality file. In other words, a symbol file has one reference and hits indicate how many times this symbol appears in the locality file (i.e., original raw data representation). For example, the symbol file may have a format of <symbol>:<count>:<delimiter>, <symbol>:<count>:<delimiter>, etc. In an aspect, the search service 806 may perform a symbol lookup on the symbol files 922 for text search and relational queries, i.e., to determine a given data source satisfies the text search or criteria of the relational query. In one implementation, the search service 806 may perform a lookup using a binary search algorithm on the ordered listing of symbols in the symbol file to determine whether the underlying data source satisfies text search criteria.

In an aspect, only the symbol files (i.e., and not the locality files) may be used to initiate a SEARCH, DISTINCT, and FIND database query plan. For example, to initiate a SEARCH operation for a given text string input, the search service can efficiently perform a search (e.g., binary search) of the pre-sorted symbols in a symbol file without having to be concerned about the exact position or location (if any) of the searched-for symbol in the raw data. The data edge index enables an improved search of data in object storage by providing a threshold question of whether the symbol is present at all in the data edge index prior to resolving the remainder of the result set. When final materialization is performed subsequent to the final result set being resolved, then the associated locality files can be used in the materialization process to re-create the raw data that satisfied the search queries as the result set.

The data edge index 910 further includes one or more locality files 924 (e.g., "cs_L2I") that each specify the locality of the indexed data source (i.e., where symbols are located). In an aspect, the locality files 924 may be organized into one or more locality rows having a hidden key to represent ordering of the raw or refined data source. In an aspect, the locality files do not contain physical hidden keys, but rather this is a logical concept implemented during execution of searches and queries. The hidden key is a physical order of the raw data indexed, or the logical order based on some searches and/or queries. During searches and/or queries, an array of positions (i.e., a virtual column) is ordered and/or reduced based on the search/query. Once the final array is created (based on the search/query predicates), the array can be used to materialize the results via the locality and symbol files. The search service 806 may execute a query plan having relational operations or clauses that finalize a returned result set (e.g., ORDER, GROUP, JOIN) using the locality files and without requiring the use of the symbol files. In an aspect, such relational operations (e.g., ORDER, GROUP, JOIN) only work on the specific column localities. For example, only locality files (and not symbol files) needed to do an ORDER, GROUP, or JOIN operation(s), until the final materialization is performed to resolve the final result set, at which point, the associated symbol files are used. As discussed above, the same applies to operations such as SEARCH where only symbol files are needed (and not locality files), and when the final materialization is performed, then the associated localities are needed.

In an aspect, the search service 806 may be configured to generate a query plan or query execution plan in response to a received search query, having one or more predicates, to be executed on the virtual bucket 908. Each query plan starts with scoping, then the creation of key localities based on the hidden key, that is continually sorted and/or reduced based on database functions, to ultimately be materialized via the symbol and locality files. Using the customer CSV example, a generated materialization plan query may include the following sequence of operations:

1. SEARCH—Find all street name's "Ma?n Str*t"
2. FIND|UNTIL—Find last name of "Johnson" until "Smith"
3. ORDER|GROUP—Order and group by "Country" column In one aspect, the search service 806 may process the search query such that each predicate sorts or reduces a hidden key localities array to drive a next predicate. This final hidden key localities array (e.g., "hkey_locs=read_hidden_keys(localites)") is used to finalize materialization via the symbols and locality files. Accordingly, query planning and its associated database functions are highly optimized due to the hidden key locality information. This information is small and allows for parallel and distributed execution. Example pseudocode for executing a query plan on a virtual bucket is provided in Listing 1 below.

Listing 1: Example Pseudocode for Query Plan Execution

```
def materialization( ... )
  val all_plans # list of query plans described above
  val all_manifests # list of S/L manifest pairs described above
  val scoped_manifests = [ ]
  for manifest in all_manifests:
    var scoped = true
    for plan in plans:
      if scope(manifest, plan) == false:
        scoped = false
    if scoped == true
      scoped_manifests.add(manifest)
  for manifest in scoped_manifests
    val symbols = read_i2s(manifest)
    if scope(symbols, plans):
      val localities = read_l2i(manifest)
      # create initial hidden key localities
      var hkey_locs = read_hidden_keys(localites)
      for (plan in plans):
        if plan.function == SELECT:
          hkey_locs = ... # nothing to do, take all
        elif plan.function == SEARCH:
          hkey_locs = search(plan,hkey_locs,symbols)
        elif plan.function == DISTINCT:
          hkey_locs = distinct(plan,hkey_locs,symbols)
        elif plan.function == ORDER:
          hkey_locs = order(plan,hkey_locs,localites)
        elif plan.function == FIND:
          hkey_locs = find(plan,hkey_locs,localites)
        elif plan.function == GROUP:
          hkey_locs = group(plan,hkey_locs,localites
        elif plan.function == RANGE:
          hkey_locs = range(plan,hkey_locs,localites)
      # given hidden_key_localies render rows via symbols and localites
      return realization(hkey_locs,symbols,localites)
```

In one example scenario, the data analysis service 802 may be used to process a plurality of log files generated by a network component, such as a load balancer or gateway. Such log files may contain detailed information related to network requests received by the load balancer, such as a time a request was received, the incoming client's network address (IP address), network latencies, network paths of requests, and server responses. By analyzing such data, the data analysis service 802 can analyze network traffic patterns and/or troubleshoot network-related issues. However, it is noted that large amounts of log files could be generated during a typical operating period, which may be expensive in time, size, and cost to process using known approaches. By way of example, say the data analysis service 802 processes a 1 TB dataset of log files stored in object storage, which can have approximately 3.5 billion entries (e.g., rows). The data analysis service may index this data in object storage where data is an object that can represent one or more entries (e.g., log entries) and where these objects can be grouped together to make a dataset (of log entries). It has been determined that the described technique may result in 150 GB of data edge indexing equating to 3 Kb of manifest, symbol, and locality files where the object storage system would be written to approximately 6,000 times. Assuming the object storage system has a request limit of 100 requests per second with 50 MB per second, the object storage system is fast enough to handle 150 GB of index data. Therefore, a computing fabric made of ten computing nodes could index 1 TB of log files in approximately 1 hour.

Any aspect of the data edge indexing can be changed dynamically. For instance, the size of the symbol and locality files can be increased, decreased, split, or merged to produce optimal sizes for requested access to the object storage system. For instance, the data analysis system may detect whether two or more index sets have common or related information, and may merge them together to reduce duplication, entropy, and the number of symbol-locality pairs. Merging is dependent on the particular data set indexed, but can greatly reduce the size of the overall logical index, as well as the number of object storage requests needed to materialize the original dataset.

Referring back to FIG. 9, the manifest file(s) 912 of the data edge index can be arranged in a tree-like data structure that summarizes portions of the manifest for faster access and query execution. In an aspect, for each logical index, there may be a root manifest file (i.e., "M-Root") that describes the topology of the dataset. Manifest files can be summarized and reference other "leaf" manifest files, which can represent an amount of raw data up to a threshold limit (e.g., 100 GB). These manifest files are configured to scope requests to resolve a particular search and/or query. In other words, the manifest files may be used to determine whether a particular symbol and locality file pair does not have information related to a specific request. The use of such manifest files greatly reduces the number of object storage system access requests that the data analysis service 802 needs to materialize a result.

In some cases, one summarized manifest file may determine that a particular search or query result set was not in the data edge index 910, and with one object storage request (e.g., S3 request) resolve the request. In other cases, leaf manifest files can be utilized where a large data (e.g., 1 TB of log files) may have at least 10 to 100 MB file accesses to determine whether part of an index set is required to materialize the result. Therefore, only 1 to 10 access requests of the object storage system is needed to resolve a "non-existent" request. When determining if a symbol is within a symbol and locality pair via a text search or range within a relational query, the manifest file can quickly scope such requests too. It should also be noted that manifest files can be used to not just scope requests, but also to actually resolve a particular search/query based on the internal metadata stored in the manifest file itself.

The next step in scoping is a type of query plan optimization type that includes analysis of whether a particular symbol and locality file pair is required. The search service may access one or more manifest files or symbol files (which are typically a fraction of the size of the locality file) to determine if the overall pair of symbol and locality files is required to materialize a result set. In some aspects, the data edge scoping is essentially driven via manifest to symbol to locality existence-based optimizations. In other words, if it is determined that a symbol file needs to be accessed, it may be concluded that there is a high likelihood that the symbol and locality pair is required to materialize. For example, if a query or search includes a FIND/UNTIL operation for a particular symbol, the search service may determine that the particular symbol is outside of the scope of symbols within a particular symbol and locality pair, as defined by minimum and maximum statistics found in the manifest file associated with that pair. In response, the search service can refrain or otherwise exclude from processing the associated symbol and locality file.

In one aspect, the data edge index 910 may be configured as a distributed index, i.e., arranged in a distributed manner (and not in a monolithic manner) in which the plurality of manifest files, symbol files, and locality files are stored across a plurality of physical buckets within object storage. Data edge index can naturally shard or partition without having to specify sharding constraints as is required in other technologies. In some aspects, the data edge files can be linked or merged to reduce entropy/duplications of information, for example, by merging data edge pairs.

The power of a distributed index is the ability to index data sources in parallel without needing to reorganize once the indexing is complete. In some aspects, the data analysis service 802 may execute multiple instances of the indexer 804 on different worker nodes which process in parallel the raw data sources stored in object storage into symbol and locality files. Only a manifest is created at the end that logically "links" all manifest/locality/symbol pairs (M/L/S). Note that each worker (i.e., instance of an indexer 804) will create many M/L/S pairs linking the subset to be ultimately linked across all subsets during a final completion. For example, one instance of the indexer 804 may convert the raw data sources in a first physical bucket (108A) to the corresponding symbol files S1, S2, S3 and locality files L1, L2, L3, while concurrently another instance of the indexer 804 may convert the raw data sources in another different physical bucket (108B) to the corresponding symbol files S4, S5 to locality files L4, L5. Once a worker has completed converting the raw data sources in a particular physical bucket (108A) and has created a local manifest file (M1) for that bucket, the indexer 804 may link this "branch" of the data edge index to the root manifest file (M-Root), for example, by inserting an entry into the root manifest file with a reference to that local manifest file M1. The root manifest file could be stored in one of these buckets 108A, 108B or in another bucket entirely. This process of building a distributed index is improved over a traditional database with shards because the monolithic index of the traditional database (e.g., typically a b-tree data structure) must be merged or ordered due to monolithic or complete order constraints.

Aspects of the described techniques have been configured to optimize around the number of accesses required of the object storage system 103. In other words, the data analysis service has been optimized to find information efficiently. The data analysis service internally orders information and can naturally reproduce the original data source order. However, for any relational query requests where multiple columns can define a key specification (i.e., sort order), only the locality file may be required; the symbol file is only required for the final materialization. Therefore, to sort a section of a large dataset (e.g., 1 TB of log files), the scoping will have direct access to the symbol and locality pairs only required to resolve the request, where locality files will be first ordered/grouped and symbol files will be needed to materialize. The data analysis service also uniquely performs aggregations during this materialization phase.

Figure 10:
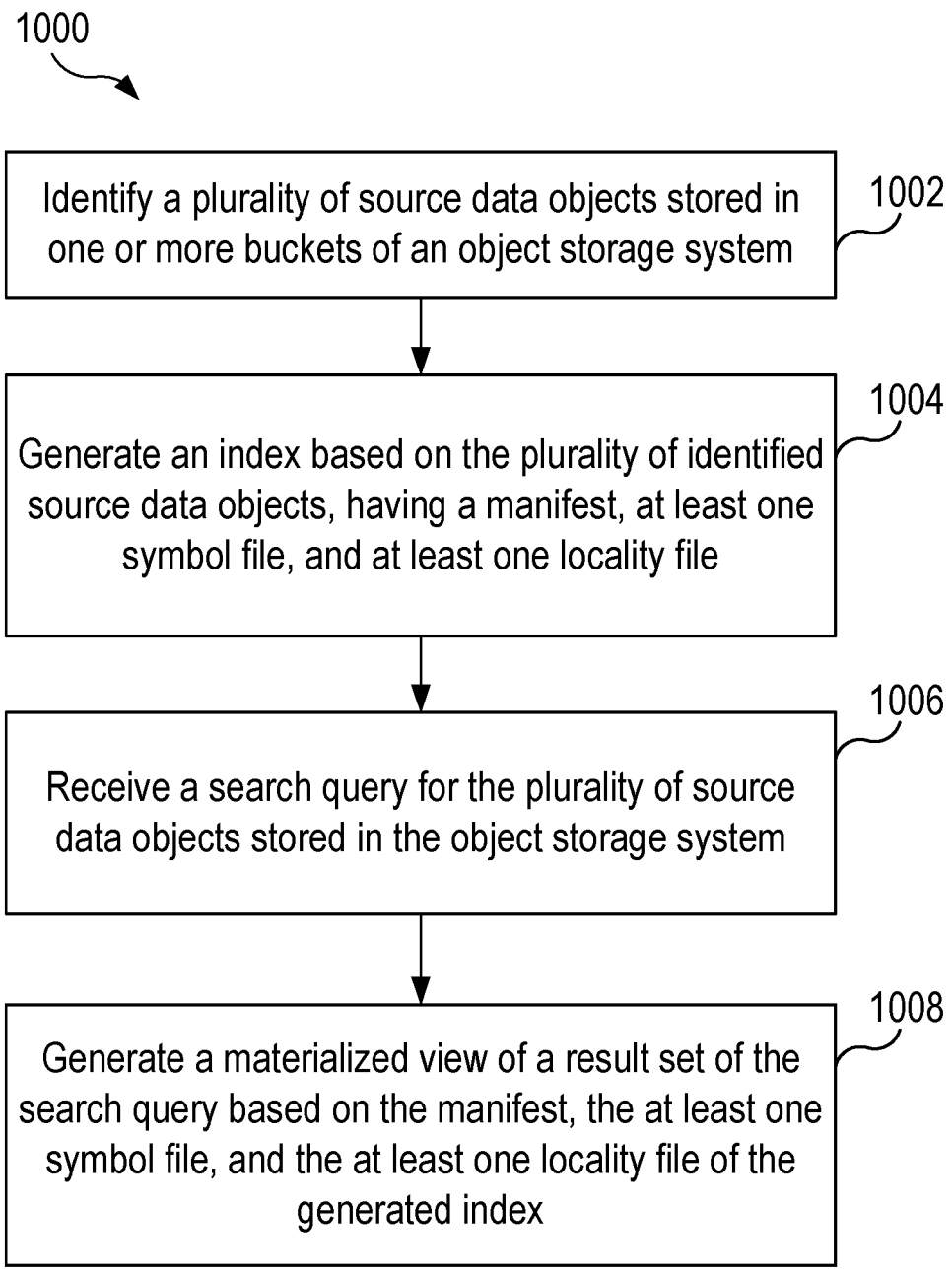
FIG. 10 is a flowchart illustrating a method for searching and querying data in object storage according to an example aspect.

FIG. 10 is a flowchart illustrating a method 1000 for searching and querying data in object storage according to an example aspect. The method may be performed by the data analysis service 802, by a sub-component of the data analysis service 802, such as the indexer 804 or search service 806, or by the object storage system 103. It is noted that the following description of the example method makes reference to the system and components described above. The method 1000 enables text search and analytics queries to be performed on object storage without the expense and additional storage costs as required by prior approaches such as data warehousing and ETL processes.

The method 1000 begins at step 1002, in which a plurality of source data objects stored in one or more buckets of an object storage system is identified. In some aspects, the identified plurality of source data objects is determined based on an object grouping specifying a criteria for inclusion in the index. In some aspects, the source data objects are identified by user input that selects a physical bucket in which the source data objects are contained. In some use cases, the user may select that physical bucket for discovery, analysis, and/or indexing. In other aspects, the source data objects are automatically triggered in response to detecting the creation or modification of the data objects in object storage.

At step 1004, the indexer 804 may generate an index based on the plurality of identified source data objects. In an aspect, the index includes a manifest, at least one symbol file, and at least one locality file, and the manifest specifies a mapping of the at least one symbol file to the corresponding at least one locality file. In some aspects, the manifest may include a tree data structure of leaf manifest files having a root manifest file that summarizes at least one of the leaf manifest files. In an aspect, the symbol file is associated with a first data object of the plurality of source data objects and comprises a sorted unique set of the symbols from the first data object, wherein each of the symbols is stored at a corresponding location within the symbol file. The locality file that is mapped to the symbol file includes a plurality of location values referencing the corresponding symbol file, wherein a location value at a respective position within the locality file represents an occurrence in the first data object of a corresponding symbol identified by the respective location value.

In an aspect, the data analysis service may publish a first virtual bucket associated with the generated index. In some aspects, subsequently, the data analysis service may generate a second virtual bucket by executing a transformation operation on the first virtual bucket, wherein the transformation operation includes a change in schema type, a change in an order of schema, a change in sort order, aggregation operations, and/or correlation operations.

At step 1006, the data analysis service 802 may receive a search query for the plurality of source data objects stored in the object storage system. In some aspects, the search query may be one of a relational query and a text search.

At step 1008, the data analysis service 802 generates a materialized view of a result set of the search query based on the manifest, the at least one symbol file, and the at least one locality file of the generated index. In an aspect, the materialized view may be a matrix of columns and rows of data representing an ordered/reduced dataset of one or more data edge files' matrix of columns and rows. In some cases, such as in which the search query requests an aggregation of the data edge data, additional column(s) and/or row(s) will be added (e.g., a SUM column of data edge). In other cases such as a request for a JOIN operation on two data edge datasets, the number of columns may be 1 minus the total number of data edge columns, where the minus is based on the joined column across the data edge datasets other In some aspects, the data analysis service may query the generated index in a sequence order comprised of the manifest, the at least one symbol file, and the at least one locality file. In some aspects, the data analysis service may use the locality file and the symbol file to return a result set based on the location of the symbols in the data source file.

Virtual Bucket Queries

Analytics commands for information in a virtual bucket may include any of Sum, Minimum, Maximum, Average (of columns), etc.

Each virtual bucket may have a corresponding key specification that dictates how keys are derived from the tabular data in order to populate the listing of each virtual bucket. A key specification may be detailed by an ordered list of columns from the schema of the virtual bucket and describes how these keys are constructed.

A key may be derived from a row by extracting the values corresponding to the columns in the key spec and concatenating them together, in key spec order, using "/" as a delimiter between values. For example, for tabular source data with columns, "foo", "bar", and "baz" as in Table 1, a virtual bucket with a key spec of [foo, baz], would contain the following keys 1/Z, 2/Y, 3/X.

TABLE 1

| foo | bar | baz |
|-----|-----|-----|
| 1   | a   | Z   |
| 2   | b   | Y   |
| 3   | c   | X   |

And a virtual bucket with the same source and a key spec of [baz, foo, bar] would contain X/3/c, Y/2/b, Z/1/a.

To list the keys in a virtual bucket, you can simply issue a standard S3 GET Bucket (List Objects) Version 2 request on the bucket. In addition to the standard requirements for this call, the following restrictions may be imposed on the parameters when the target is a virtual bucket:

list-type—Only supports "2" (GET Bucket Version 2)
delimiter—Only supports "/"
prefix—Only valid for prefix values comprised of whole key parts
Prefix "foo/" will match key "foo/bar"
Prefix "foo/ba" will not match key "foo/bar"

Along with a key specification, each virtual bucket may also have an associated row specification describing the source and order of each column in the virtual bucket. The object data corresponding to a key in a virtual bucket may be the set of rows, in csv format, which would produce that key according to the key specification for the virtual bucket. Columns of the resulting csv appear in the order given by the row specification, and rows may be presented in ascending key order.

A virtual bucket may be represented by the following data in Table 2 (with columns in row spec order):

TABLE 2

| foo | bar | baz |
|-----|-----|-----|
| 1   | a   | Z   |
| 2   | b   | Z   |
| 3   | b   | Z   |

With key specification of [bar], it would produce the following object data for keys "a" and "b":

| a -> | 1,a,Z |
| b -> | 2,b,Z |
|      | 3,b,Z |

To retrieve the row data for a given key in a virtual bucket, a GET Object request can be issued on the key targeting that bucket. In certain aspects, there might not be support of the available GET Object request header or URI query parameters when targeting virtual buckets.

However, an extension to GET Object behavior may be provided, e.g., which may be referred to as a common prefix GET Object. This common prefix GET object may extend the valid keys for a GET Object request to any valid key prefix for the bucket. A GET Object request specifying a key prefix instead of a fully qualified key may be serviced as if the virtual bucket had a key specification with only the supplied key parts.

Using the data from the previous example above, a virtual bucket with a key specification of [baz, bar, foo] would produce the following object data for the given common prefix requests:

| Z/a | -> |       | 1,a,Z |
| Z/b | -> |       | 2,b,Z |
|     |    |       | 3,b,Z |
| Z   | -> | 1,a,Z |       |
|     |    | 2,b,Z |       |
|     |    | 3,b,Z |       |

Similar to support for the prefix parameter of GET Bucket object listing, common prefix values may be comprised of complete key parts (delimited by "/") to match any keys. Moreover, common prefix GET Object requests might only be valid on virtual buckets, e.g., not on physical buckets.

Aspects presented herein support analysis via the virtual bucket construct. The following are the four example aspects to virtual bucket querying: common prefix search; point and range reads search; wildcarding prefixing, start, end, sub; and aggregation functions, e.g., sum, average, count, minimum, maximum, standard, etc.

When specifying a path for a GET Object or GET Bucket (List Objects) request on a virtual bucket, support may be provided for either literal paths or path constraints specified in the query language.

Path constraints specified in the query language may be designed to resemble literal paths. For example, 3QL constraints are "/" delimited strings, where the characters after the nth (and before the n+1th) delimiter represent a constraint on the nth column in the key spec of the virtual bucket. Thus, for a key specification of [foo,bar,baz], then the path constraint may have the form /[foo constraint]/[bar constraint]/[baz constraint].

Column constraints may be paired with the virtual bucket key spec from left to right. It is possible for the query path constraint to contain fewer column constraints than columns in the virtual bucket key spec. In this case, the rightmost columns from the key spec without corresponding query constraints may be considered unconstrained. Since column constraints are positional, it may be possible to identify a constrained column by either its name or an underbar ("_"). It may otherwise be an error to specify a component of a path constraint with a column name that doesn't match the corresponding column in the key spec for the virtual bucket.

Literals specified in constraints may be raw or quoted. Both single and double quotes can be used to quote string literals (and may be nested, unescaped, within one another). Example point/range constraints may include:

|  | Examples |
|---|---|
| Equality |  |
| [column\|_]=[literal\|${column}] | foo=3 |
|  | foo=${bar} |
|  | foo=hello |
|  | foo='say "hi"' |
| Range |  |
| [column\|_][<\|<=][literal\|${column}] | foo<5 |
| [column\|_][>\|>=][literal\|${column}] | foo>=${bar} |
| [literal\|${column}][<\|<=][column\|_][<\|<=][literal\|${column}] | 1<=foo<4 |
|  | apple<foo<=banana |

Example string matching constraints may include:

|  | Examples |
|---|---|
| Prefix |  |
| [column\|_]=[literal]* | foo=hello wor* |
| Suffix |  |
| [column\|_]=*[literal] | foo=*lo world |
| Wildcard |  |
| [column\|_]=* | foo=* |

In addition to the constraint specification, it may also be possible to specify an aggregation function to apply to the result set of a GET Object request on a virtual bucket. This may be done by adding an aggregation prefix to the query constraint: Example aggregation functions may include:

| Aggregations | Examples |
|---|---|
| count:[path constraint] | count:/foo>3 |
|  | count:/bar=Boston |
| [sum\|avg\|std\|min\|max]([column]):[path constraint] | sum(foo):/1<=foo<5/bar=Hello* |
|  | min(bar):/foo=5 |

TABLE 3

| foo | bar | baz |
|---|---|---|
| 1 | apple | Boston |
| 2 | application | Somerville |
| 3 | banana | Medford |
| 4 | cat | Medford |

For an example dataset in Table 3, a Key spec: [baz,foo, bar] may correspond to:

| /baz=Boston | -> | 1,apple,Boston |
| /baz=Med* | -> | 3,banana,Medford |
|  |  | 4,cat,Medford |
| count:/_=*/foo>=2 | -> | 3 |
| sum(foo):/baz=Medford | -> | 7 |

In an example workflow according to the aspects presented herein, the user may: identify a physical bucket in simple object storage you wish to explore and report on; direct the service to discover file distribution to be logically grouped; create logical file group filters either automatically or manually; select a group to model that executes a deep data analysis, refine modelled groups once modeling is complete; and refining aggregates multi groups that can be shaped, correlated and sorted. Once refinement is complete, the logical result set may be, e.g., a virtual bucket. The virtual buckets may look and act like physical buckets while also supporting analytic queries.

As follows, the present disclosure provides an example of the data analysis service 802 querying log data based on a structured data structure and two different queries. The first query considered is to find the top 50 client IP addresses with HTTP-404 errors within a certain time window range. The second query discussed is to find the top 50 client IP addresses with HTTP-404 errors with a text search request. In this example, the log data are HTTP logs that are a collection of JSON objects based on five fields describing a specific web URL request, which having the following schema of field names and data types, respectively:

timestamp: DATA
size: INTEGER
status: INTEGER
request: TEXT
clientip: IP ADDRESS Listing 2 provides an example of the first query configured for finding the top 50 most frequently occurring client IP addresses with HTTP-404 errors within a certain time window range within the indexed data. Although the example query is provided using Elasticsearch syntax, it is understood that any other suitable query syntax may be used.

Listing 2: Example Query for Analyzing Log Data

```
Elasticsearch Query = '''
{ "size": 0, "_source": { "excludes": [ ] },
  "aggs": { "2": { "terms": { "field": "request.raw", "size": 50, "order": {
    "_count": "desc" } } } },
  "stored_fields": [ "*" ],
  "script_fields": { },
  "docvalue_fields": [ "@timestamp" ],
  "query": { "bool": { "must": [
    { "match_all": { } },
```

Listing 2: Example Query for Analyzing Log Data

```
  {
    {
      { "match_phrase": { "status": { "query": 404 } } },
      { "range": { "@timestamp": { "gte": %d, "lte": %d, "format":
          "epoch_millis" } } }
    ], "filter": [ ], "should": [ ], "must_not": [ ]
    }
  }
}
```

In response to receiving this query, the search service creates a query plan to be executed using the data edge indexes. The search service translates the query shown in Listing 2 into the following plan instructions:

1. FIND|UNTIL—time range specified
2. SEARCH—find all status with 404
3. GROUP|AGGREGATE—group by request; aggregate into count
4. ORDER|LIMIT—order by count descending; limit by 50

Each aspect of the query plan is designed to reduce (i.e., scopes) the required object storage access. For instance, the FIND|UNTIL instructions was chosen first based on the nature of a log source. In other words, the initial manifest-file root read allows the search service to determine that the dataset can be segmented by timestamp and that the FIND-|UNTIL instructions would reduce the amount of access to object storage. The SEARCH instruction was not selected since it was determined that the status 404 has an even distribution across the entire dataset. However, there are cases where a SEARCH instruction would be the optimal choice. For instance, in cases in which a query seeks to determine whether a particular word and/or phrase exists within a particular segment of object data.

Therefore, if the HTTP log dataset has an even distribution of entries based on timestamp, a window of time of 1 day is represented by 6 Data Edge index segments, this would equate to a maximum of 1+12 GET requests to object storage. In other words, 1 GET request is issued for retrieving the manifest file root (M root), and 12 GET requests are issued for retrieving the source and locality files, where each source file could be used to determine that the associated locality file is not required due to a determination of non-existence (i.e., the searched-for "404" symbol is not found in the symbol file). The retrieved index segment data can be used to resolve the remaining query plan.

Listing 3 provides an example of the second query configured for finding the top 50 client IP addresses with HTTP-404 errors that includes a particular text phrase.

Listing 3: Example Query for Analyzing Log Data

```
Elasticsearch Query = '''
  { "size": 0, "_source": { "excludes": [ ] },
    "aggs": { "2": { "terms": { "field": "request.raw", "size": 50, "order": {
      "_count": "desc" }
    } } },
    "stored_fields": [ "*" ],
    "script_fields": { },
    "docvalue_fields": [ "@timestamp" ],
    "query": { "bool": { "must": [
      { "query_string": { "query": "request:GET", "analyze_wildcard": true,
        "default_field": "*"
      } },
      { "match_phrase": { "status": { "query": 404 } } },
      { "range": { "@timestamp": { "gte": %d, "lte": %d, "format":
        "epoch_millis" } } }
      ],
      "filter": [ ],
      "should": [ ],
      "must_not": [ ]
      }
    }
  }
}
```

In response to receiving the example query found in Listing 3, the search service may generate a query plan to be executed against the data edge fabric using the data edge indexes. The search service may translate the above query of Listing 3 into the following query plan instructions:

1. FIND|UNTIL—time range specified
2. SEARCH—status with 404 AND requests with GET
3. GROUP|AGGREGATE—group by request; aggregate into count
4. ORDER|LIMIT—order by count descending; limit by 50

Assuming the same time window as in the first query analysis, this query plan is identical to the first where the difference being the additional scoping based on the additional search requirement ("404" and "GET"). In other words, the object storage system access requirements may be similar but potentially larger than the first query since a particular entry now must satisfy the search criteria of both "404" and "GET" search terms. This could greatly reduce the number of L required based on determination of non-existence.

Figure 11:
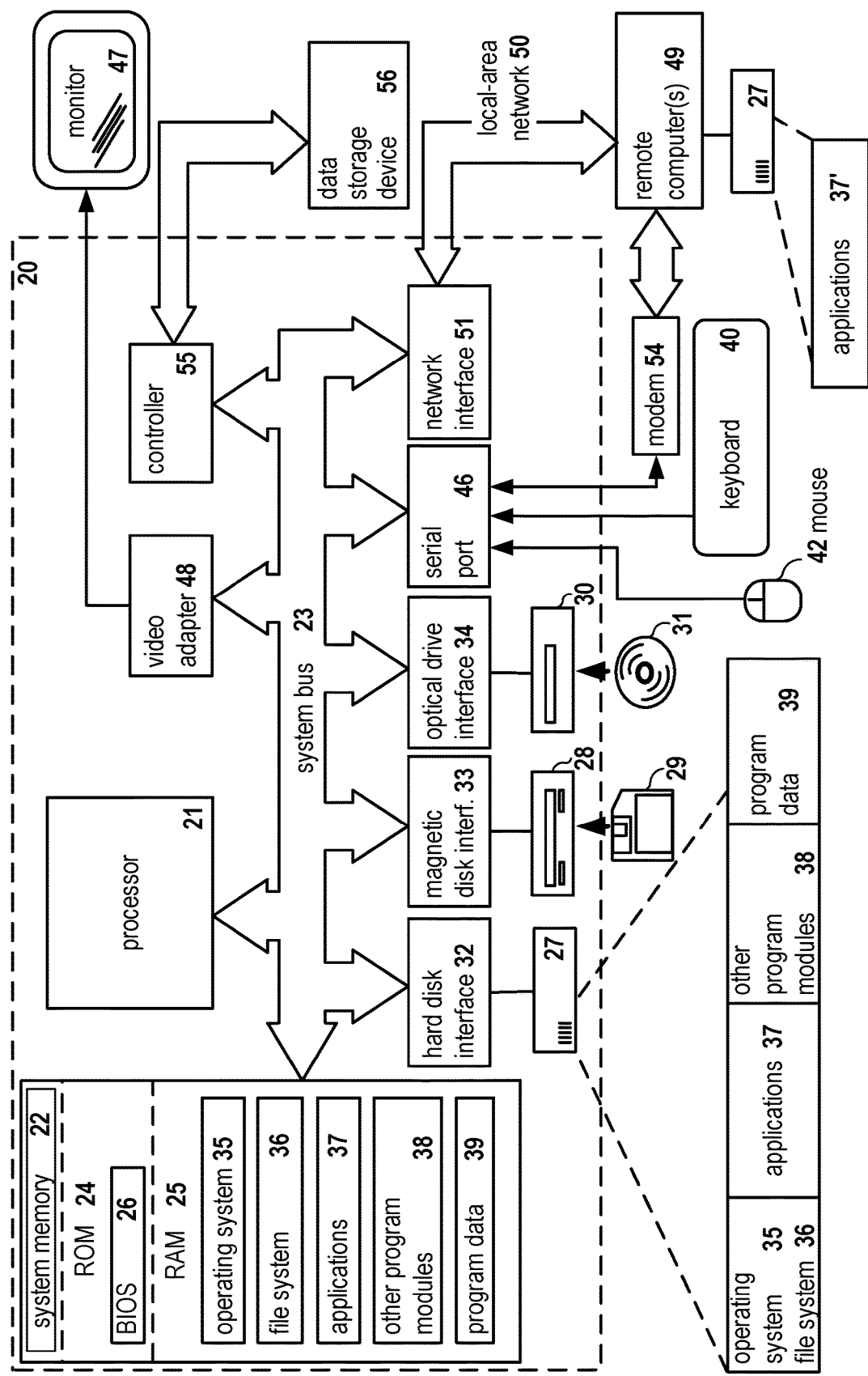
FIG. 11 is a block diagram of a computer system on which the disclosed system and method can be implemented according to an example aspect.

FIG. 11 is a block diagram illustrating a computer system 20 on which aspects of systems and methods for processing files stored in object storage systems may be implemented in accordance with an example aspect. It should be noted that the computer system 20 can correspond to the computing device 101, the object-based storage system 103, and the physical server(s) on which the data analysis service 106 is executing, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An example aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 11, above). Accordingly, each module may be realized in a variety of suitable configurations, and should not be limited to any particular implementation exemplified herein

What is claimed is:

1. A computer-implemented method for searching object storage, comprising:
    identifying a plurality of source data objects stored in one or more buckets of an object storage system;
    generating an index based on the identified plurality of source data objects, wherein the index comprises a manifest, at least one symbol file, and at least one locality file,
        wherein the manifest specifies a mapping of the at least one symbol file to the corresponding at least one locality file
        wherein the at least one symbol file is associated with a first data object of the plurality of source data objects and comprises a sorted unique set of symbols from the first data object,
        wherein each of the symbols is stored at a corresponding location within the at least one symbol file, wherein the at least one locality file mapped to the at least one symbol file comprises a plurality of location values referencing the corresponding symbol file, and wherein a location value at a respective position within a locality file represents an occurrence in the first data object of a corresponding symbol identified by the respective location value;

receiving a search query for the plurality of source data objects stored in the object storage system; and generating a materialized view of a result set of the search query based on the manifest, the at least one symbol file, and the at least one locality file of the generated index.

2. The method of claim 1, wherein the identified plurality of source data objects is determined based on an object grouping specifying a criteria for inclusion in the index.

3. The method of claim 1, further comprising:
publishing a first virtual bucket associated with the generated index.

4. The method of claim 3, further comprising:
generating a second virtual bucket by executing a transformation operation on the first virtual bucket, wherein the transformation operation includes at least one of a change in schema type, a change in an order of schema, and a change in sort order.

5. The method of claim 1, wherein the manifest comprises a tree data structure of leaf manifest files having a root manifest file that summarizes at least one of the leaf manifest files.

6. The method of claim 1, wherein generating the materialized view of the result set of the search query based on the manifest, the at least one symbol file, and the at least one locality file of the generated index further comprises:
querying the generated index in a sequence order comprised of the manifest, the at least one symbol file, and the at least one locality file.

7. The method of claim 1, wherein the search query comprises one of a relational query and a text search.

8. The method of claim 1, wherein generating the materialized view of the result set of the search query based on the manifest, the at least one symbol file, and the at least one locality file of the generated index further comprises:
using the at least one locality file and the at least one symbol file to return the result set based on a location of the symbols in a data source file.

9. A computer apparatus for searching object storage, comprising:
memory; and
at least one processor coupled to the memory and configured to:
identify a plurality of source data objects stored in one or more buckets of an object storage system;
generate an index based on the identified plurality of source data objects, wherein the index comprises a manifest, at least one symbol file, and at least one locality file,
wherein the manifest specifies a mapping of the at least one symbol file to the corresponding at least one locality file,
wherein the at least one symbol file is associated with a first data object of the plurality of source data objects and comprises a sorted unique set of symbols from the first data object,
wherein each of the symbols is stored at a corresponding location within the at least one symbol file,
wherein the at least one locality file mapped to the at least one symbol file comprises a plurality of location values referencing the corresponding symbol file, and
wherein a location value at a respective position within a locality file represents an occurrence in the first data object of a corresponding symbol identified by the respective location value;
receive a search query for the plurality of source data objects stored in the object storage system; and
generate a materialized view of a result set of the search query based on the manifest, the at least one symbol file, and the at least one locality file of the generated index.

10. The computer apparatus of claim 9, wherein the identified plurality of source data objects is determined based on an object grouping specifying a criteria for inclusion in the index.

11. The computer apparatus of claim 9, wherein the at least one processor is further configured to publish a first virtual bucket associated with the generated index.

12. The computer apparatus of claim 11, wherein the at least one processor is further configured to:
generate a second virtual bucket by executing a transformation operation on the first virtual bucket, wherein the transformation operation includes at least one of a change in schema type, a change in an order of schema, and a change in sort order.

13. The computer apparatus of claim 9, wherein the manifest comprises a tree data structure of leaf manifest files having a root manifest file that summarizes at least one of the leaf manifest files.

14. The computer apparatus of claim 9, wherein the at least one processor configured to generate the materialized view of the result set of the search query based on the manifest, the at least one symbol file, and the at least one locality file of the generated index is further configured to:
query the generated index in a sequence order comprised of the manifest, the at least one symbol file, and the at least one locality file.

15. The computer apparatus of claim 9, wherein the search query comprises one of a relational query and a text search.

16. The computer apparatus of claim 9, wherein the at least one processor configured to generate the materialized view of the result set of the search query based on the manifest, the at least one symbol file, and the at least one locality file of the generated index is further configured to:
use the at least one locality file and the at least one symbol file to return the result set based on a location of the symbols in a data source file.

17. A non-transitory computer-readable medium storing computer executable code for searching object storage, comprising code to:
identify a plurality of source data objects stored in one or more buckets of an object storage system;
generate an index based on the identified plurality of source data objects, wherein the index comprises a manifest, at least one symbol file, and at least one locality file,
wherein the manifest specifies a mapping of the at least one symbol file to the corresponding at least one locality file,
wherein the at least one symbol file is associated with a first data object of the plurality of source data objects and comprises a sorted unique set of symbols from the first data object, wherein each of the symbols is stored at a corresponding location within the at least one symbol file, wherein the at least one locality file mapped to the at least one symbol file comprises a plurality of location values referencing the corresponding symbol file, and wherein a location value at a respective position within a locality file represents an occurrence in the first data object of a corresponding symbol identified by the respective location value;

receive a search query for the plurality of source data objects stored in the object storage system; and generate a materialized view of a result set of the search query based on the manifest, the at least one symbol file, and the at least one locality file of the generated index.

18. The method of claim 1, wherein generating the materialized view of the result set of the search query based on the manifest, the at least one symbol file, and the at least one locality file of the generated index further comprises:

using the manifest to identify one or more symbol files that include information related to the search query;

using the identified one or more symbol files to identify one or more symbol and locality file pairs that include information related to the search query; and performing access requests at the object storage system to retrieve the respective symbol files and corresponding locality files of each identified symbol and locality file pair.

19. The method of claim 1, wherein the result set of the search query is determined by processing the index and refraining from accessing the source data objects of the object storage system.

20. The method of claim 1, wherein generating the materialized view of the result set of the search query based on the manifest, the at least one symbol file, and the at least one locality file of the generated index further comprises:

using the manifest to identify one or more locality files that include information related to the search query;

performing access requests at the object storage system to retrieve the one or more identified locality files;

processing the one or more identified locality files to resolve the search query; and performing access requests at the object storage system to retrieve the one or more symbols for the result set from the one or more symbol files corresponding to the one or more identified locality files based on the processing to resolve the search query.

* * * * *